(12) United States Patent
Jung et al.

(10) Patent No.: US 9,766,694 B2
(45) Date of Patent: Sep. 19, 2017

(54) MOBILE TERMINAL AND CONTROLLING METHOD THEREOF

(71) Applicant: LG ELECTRONICS INC., Seoul (KR)

(72) Inventors: Sehyun Jung, Seoul (KR); Sesook Oh, Seoul (KR); Yoonseok Yang, Seoul (KR); Shinnyue Kang, Seoul (KR); Kyungjin Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 117 days.

(21) Appl. No.: 13/867,267

(22) Filed: Apr. 22, 2013

(65) Prior Publication Data

US 2014/0184486 A1 Jul. 3, 2014

(30) Foreign Application Priority Data

Dec. 31, 2012 (KR) .................. 10-2012-0158134

(51) Int. Cl.
*G06F 3/00* (2006.01)
*G06F 3/0488* (2013.01)
*H04N 5/232* (2006.01)

(52) U.S. Cl.
CPC ............ *G06F 3/005* (2013.01); *G06F 3/0488* (2013.01); *H04N 5/23216* (2013.01); *H04N 5/23293* (2013.01)

(58) Field of Classification Search
CPC ... G06F 3/005; G06F 3/0488; H04N 5/23293; H04N 5/23216
See application file for complete search history.

(56) References Cited

U.S. PATENT DOCUMENTS

| | | | | |
|---|---|---|---|---|
| 7,623,742 | B2 * | 11/2009 | Kim et al. | 382/321 |
| 8,745,018 | B1 * | 6/2014 | Singleton | G06F 17/30899 707/705 |
| 8,782,077 | B1 * | 7/2014 | Rowley | G06F 17/30864 707/769 |
| 2005/0190279 | A1 * | 9/2005 | Nobels | H04N 1/00127 348/333.02 |
| 2007/0067272 | A1 * | 3/2007 | Flynt | G06F 3/0482 |
| 2012/0030234 | A1 * | 2/2012 | Ramachandrula et al. | 707/769 |
| 2012/0290967 | A1 * | 11/2012 | Scott | G06F 17/30967 715/780 |
| 2012/0317484 | A1 * | 12/2012 | Gomez | G06F 3/03547 715/716 |

OTHER PUBLICATIONS

Google (Youtube video at https://www.youtube.com/watch?v=wxEyQ6l8lqw, dated on Oct. 5, 2010, of which several screenshots have been taken and included in this office action), attached as google.pdf.*

* cited by examiner

*Primary Examiner* — Alexander R Eisen
*Assistant Examiner* — Abhiskek Sarma
(74) *Attorney, Agent, or Firm* — KED & Associates LLP

(57) ABSTRACT

There are disclosed a mobile terminal and a controlling method thereof, which is able to simply input a real-time external image to an input field as data, specifically, such that a user may input a character or picture captured from the real-time image inputted from the outside via the camera and that the real time image maybe captured without switching a screen displaying the input field, so as to allow a user to intuitively recognize which input field an object provided in the image is inputted to.

20 Claims, 24 Drawing Sheets

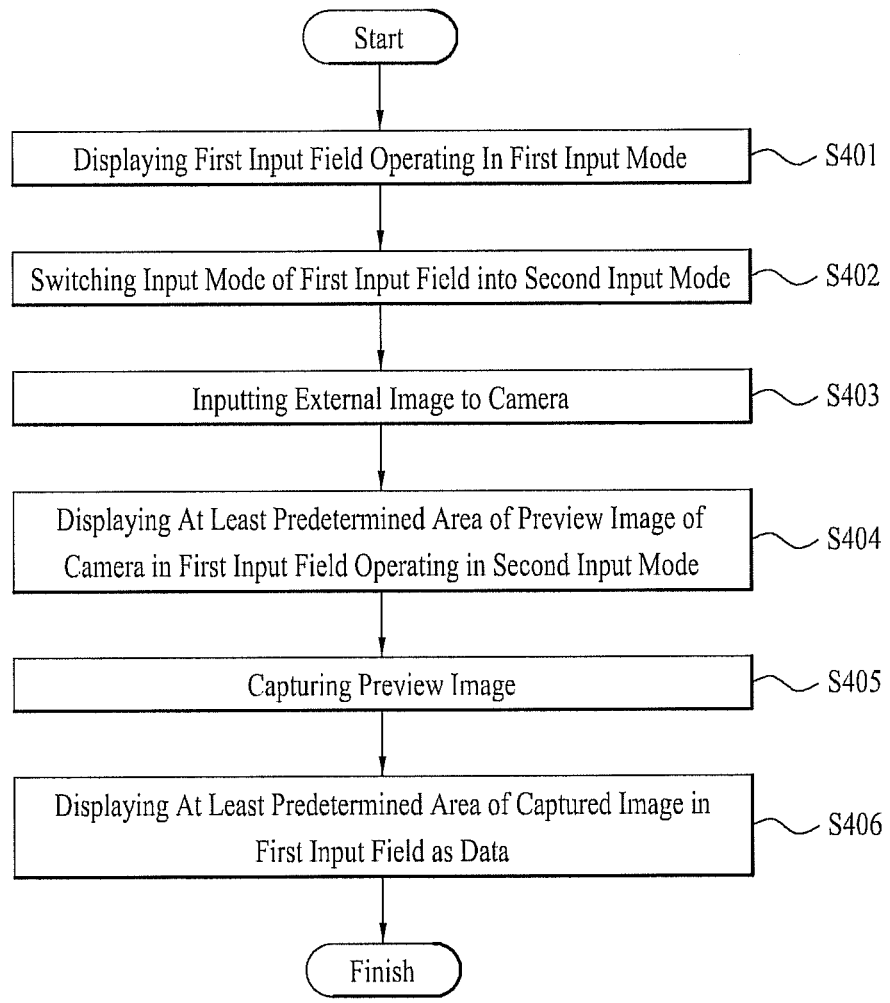

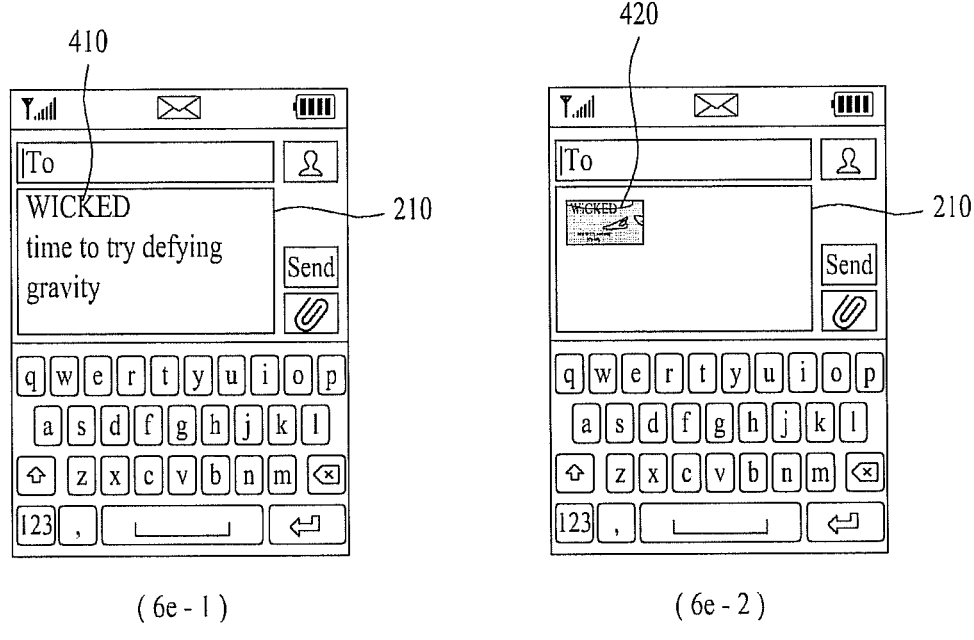

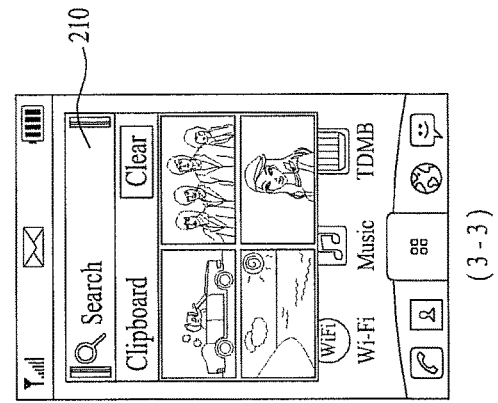
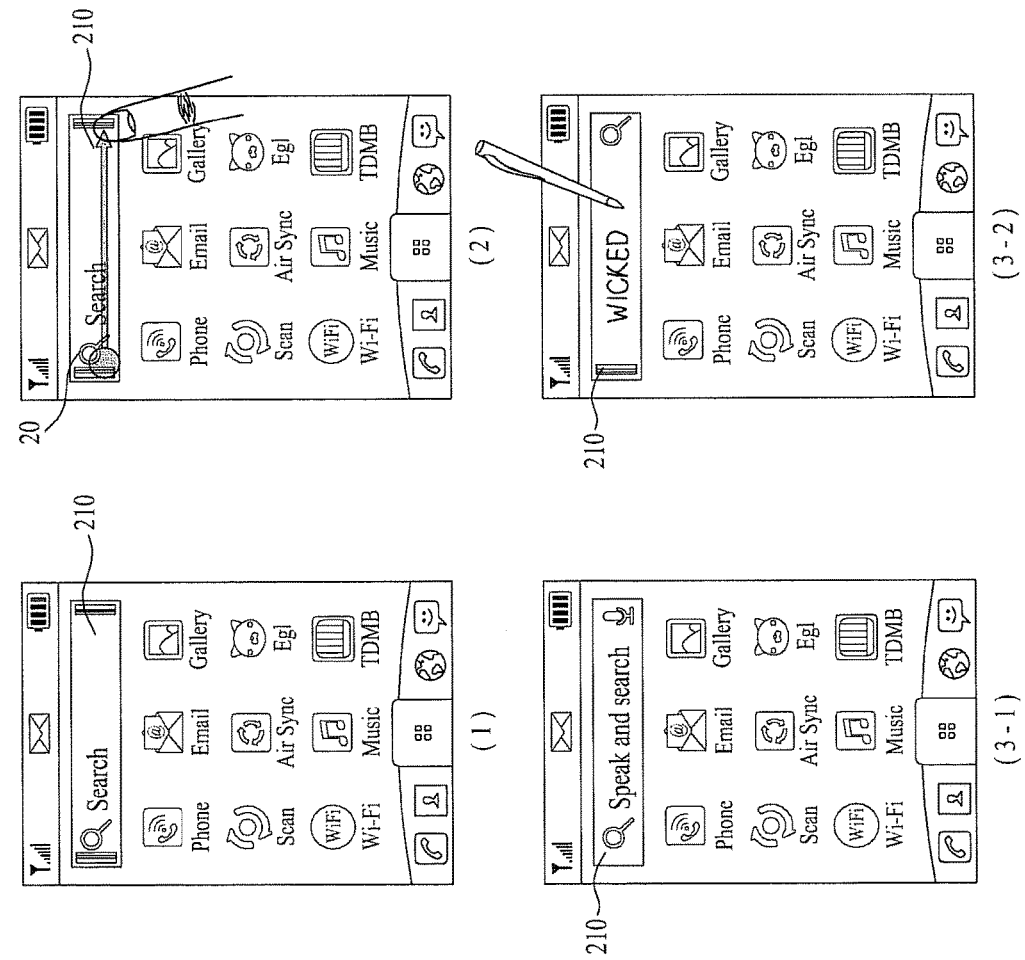
FIG. 9

FIG. 11
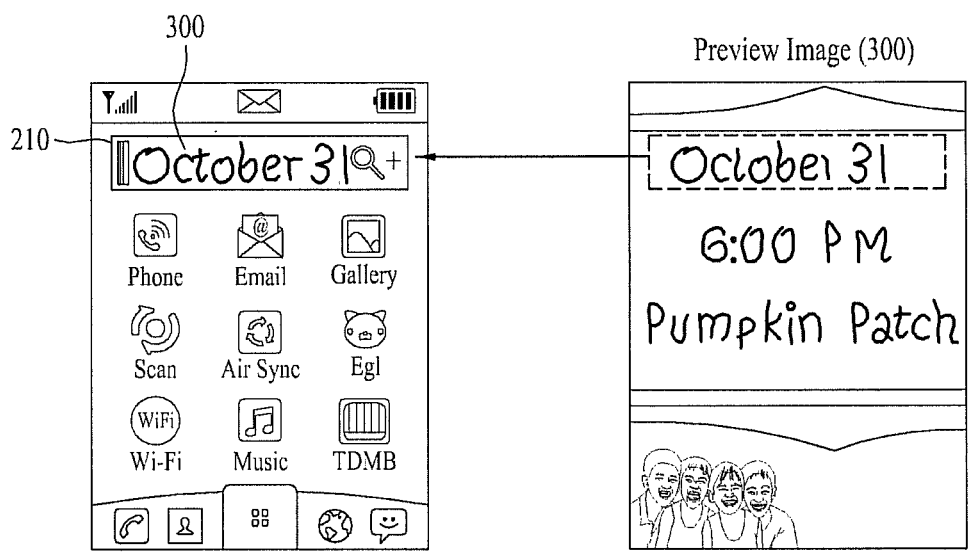
(1)
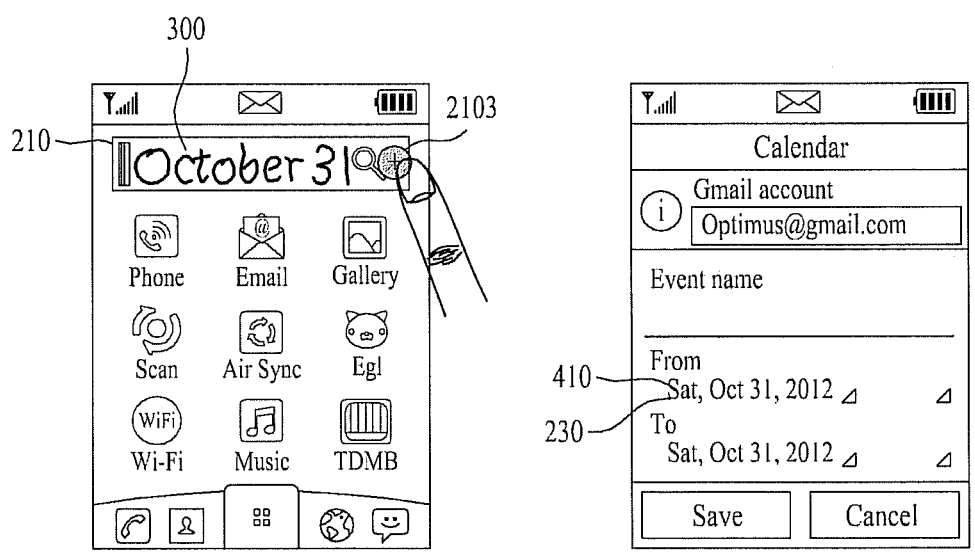
(2) (3)

FIG. 14
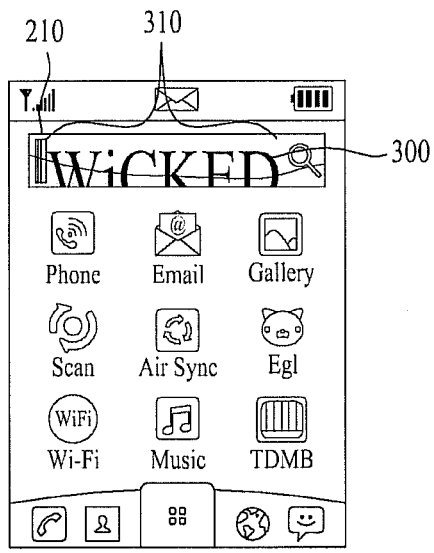 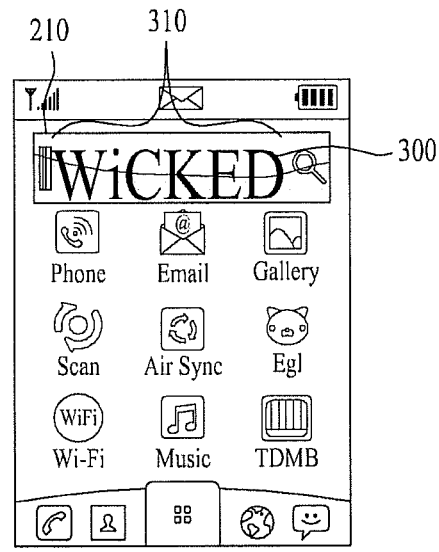
(1)          (2)
FIG. 15
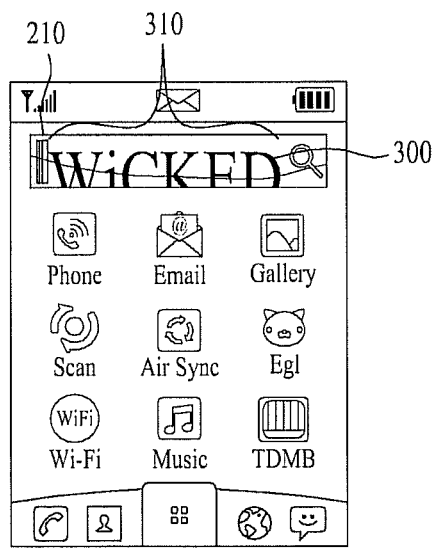 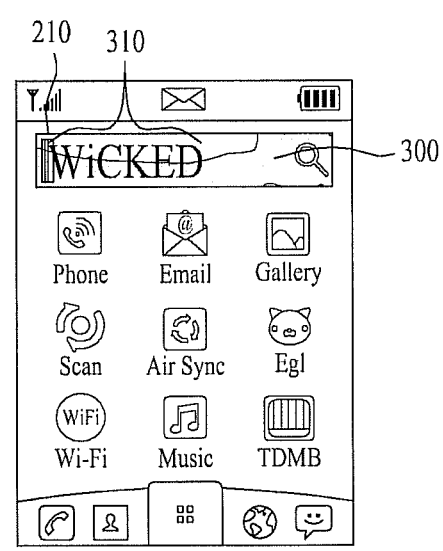
(1)          (2)

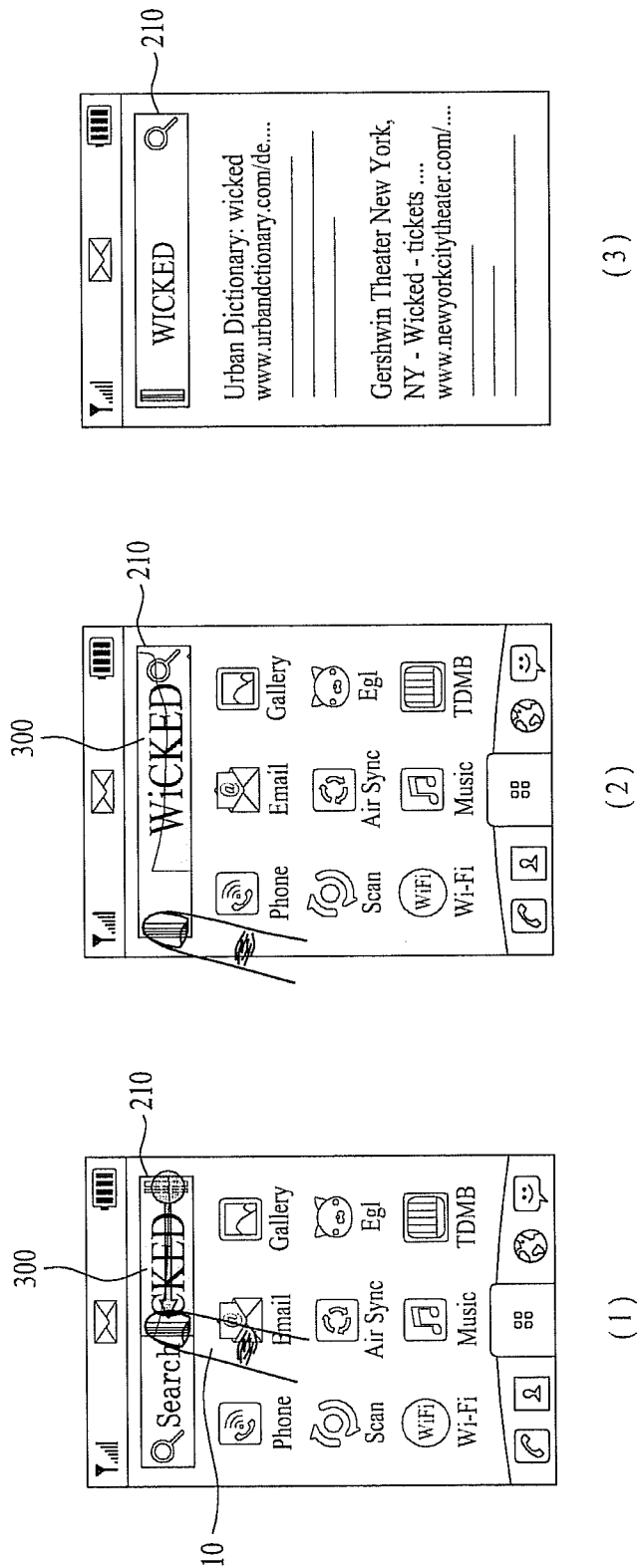

(1)            (2)

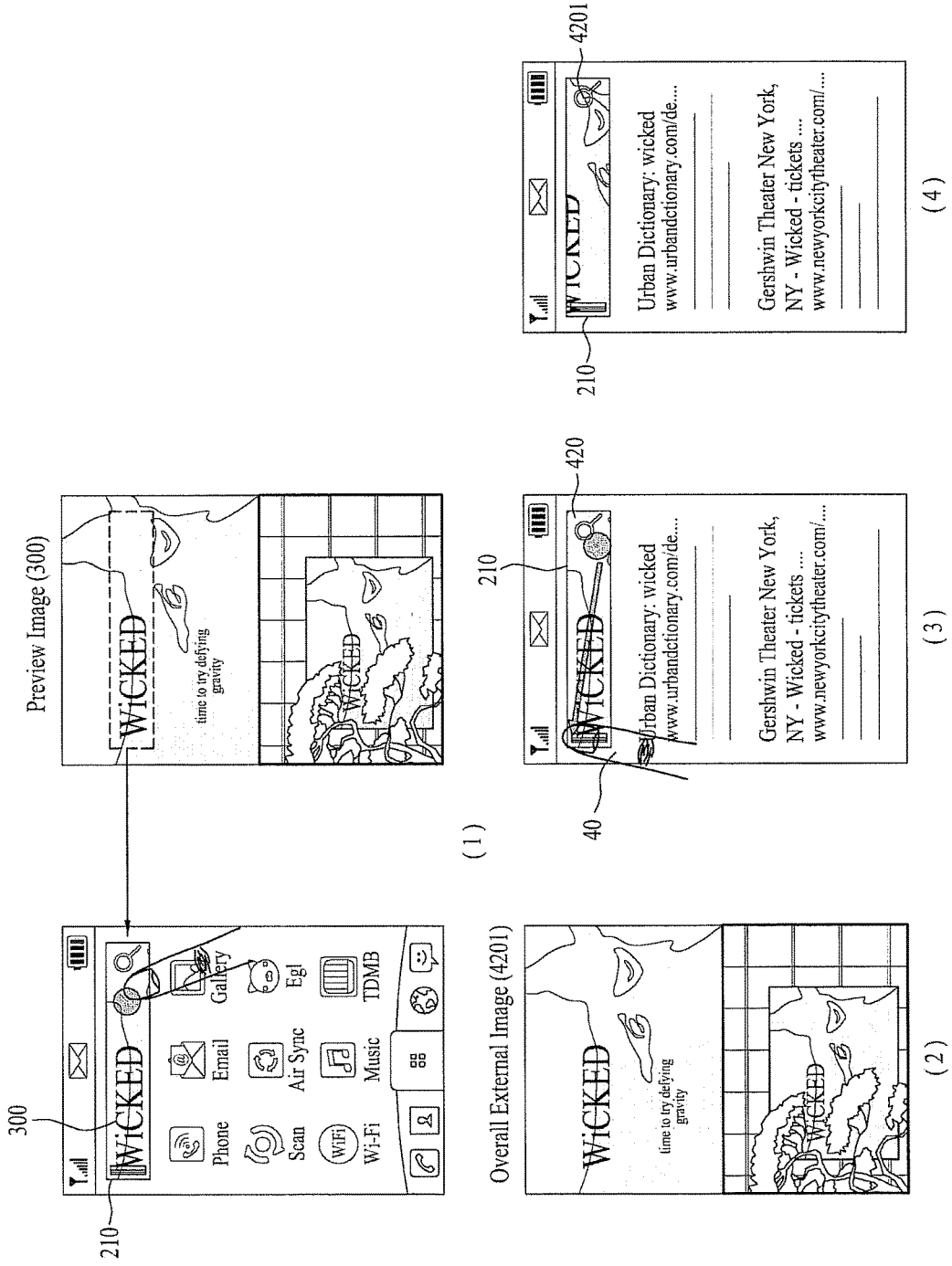

MOBILE TERMINAL AND CONTROLLING METHOD THEREOF

Pursuant to 35 U.S.C. §119(a), this application claims the benefit of earlier filing date and right of priority to Korean Application No. 10-2012-0158134, filed on Dec. 31, 2012, the contents of which are hereby incorporated by reference herein in their entirety.

BACKGROUND OF THE DISCLOSURE

Field of the Disclosure

The present invention relates to a mobile terminal that is able to provide a function for simply inputting at least a part of an image input to an input field in real time as data, and a controlling method thereof.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal.

To store/transmit information or implement an application via such the mobile terminal, a user can input data modified to be proper to various input fields, respectively. For example, the user can input a search word as text to a search engine displayed on a search application or a web browser to search a specific word. Alternatively, to store a photograph in a specific one from a contact list, one of stored images is loaded and the loaded image is input to a photograph field displayed on a contact information application as an image.

However, the user has to input the texts one by one or pre-store an image in the mobile terminal, to input data to the input fields in the conventional input mode. Although a camera provided in the mobile terminal can photograph a text that is desired to input, the user has to input texts one by one and that causes inconvenience disadvantageously. In addition, an auxiliary camera application has to be used in storing an image separately to input an image to a corresponding input field. In this process, there have to be several display change disadvantageously.

SUMMARY OF THE DISCLOSURE

Accordingly, embodiments of the present invention are directed to a mobile terminal and a method of controlling the mobile terminal that substantially obviate one or more problems due to limitations and disadvantages of the related art.

An object of the present invention is to provide a mobile terminal that is able to provide an input mode configured to immediately input data associated with an object phographable by a camera to a specific input field via an external image inputted to the camera in real time, without display switching, and a controlling method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a camera configured to input an image thereto from the outside; a display configured to display a first input field operating in a first input mode is activated; and a controller configured to control at least predetermined area of a preview image of the camera to be displayed in the first input field operating in the first input mode, when an input mode of the first input field is switched from the first input mode into a second input mode, and to control at least predetermined area of an image captured from the preview image in the first input field to be inputted to the first input field as data.

In another aspect of the present invention, a controlling method of a mobile terminal includes steps of inputting an external image to a camera; displaying a first input field operating in a first input mode; controlling at least predetermined area of a preview image of the camera in the first input field operating in the second input mode, when the input mode of the first input mode is switched from the first input mode into the second input mode; and controlling at least predetermined area of the image captured from the preview image displayed in the first input field to be inputted to the first input field as data.

Effects and/or advantages obtainable from the present invention are non-limited the above mentioned effect. And, other unmentioned effects and/or advantages can be clearly understood from the following description by those having ordinary skill in the technical field to which the present invention pertains.

It is to be understood that both the foregoing general description and the following detailed description of the preferred embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. The above and other aspects, features, and advantages of the present invention will become more apparent upon consideration of the following description of various embodiments, taken in conjunction with the accompanying drawing figures. In the drawings:

FIG. 4 is a flow chart illustrating a controlling method of a mobile terminal according to one embodiment of the present invention;

FIGS. 6a to 6e are diagrams illustrating one embodiment of a controlling method according to another embodiment;

FIG. 9 is a diagram illustrating one embodiment in case a first input mode is switched into a third input mode in the first input field based on a second user command;

FIG. 11 is a diagram illustrating another embodiment of the method for processing the data when a predetermined part of a captured image is input to a first input field as data;

FIG. 14 is a diagram illustrating one embodiment incase the size of the first input field is automatically changed according to the size of an object in a preview video file;

FIG. 15 is a diagram illustrating one embodiment in case a preview video file is automatically zoomed in or out according to the size of an object in the preview video file;

FIG. 16 is a diagram illustrating one embodiment of a method for capturing a preview image displayed in the first input field;

FIG. 18 is a diagram illustrating one embodiment of a method for storing the other part of the preview video file when an image of the preview video file displayed in the first input field.

DESCRIPTION OF SPECIFIC EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
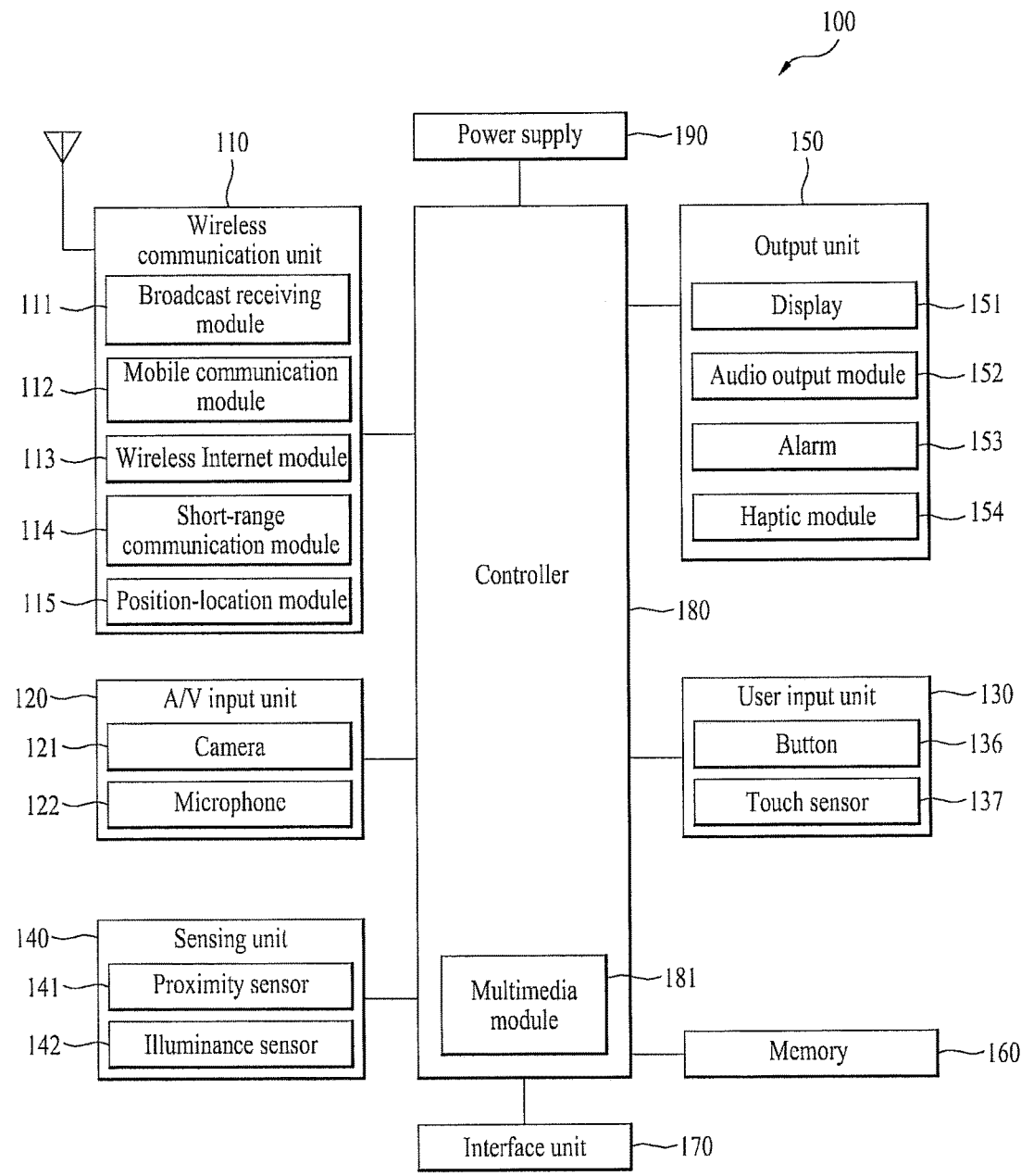
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC (Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. And, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
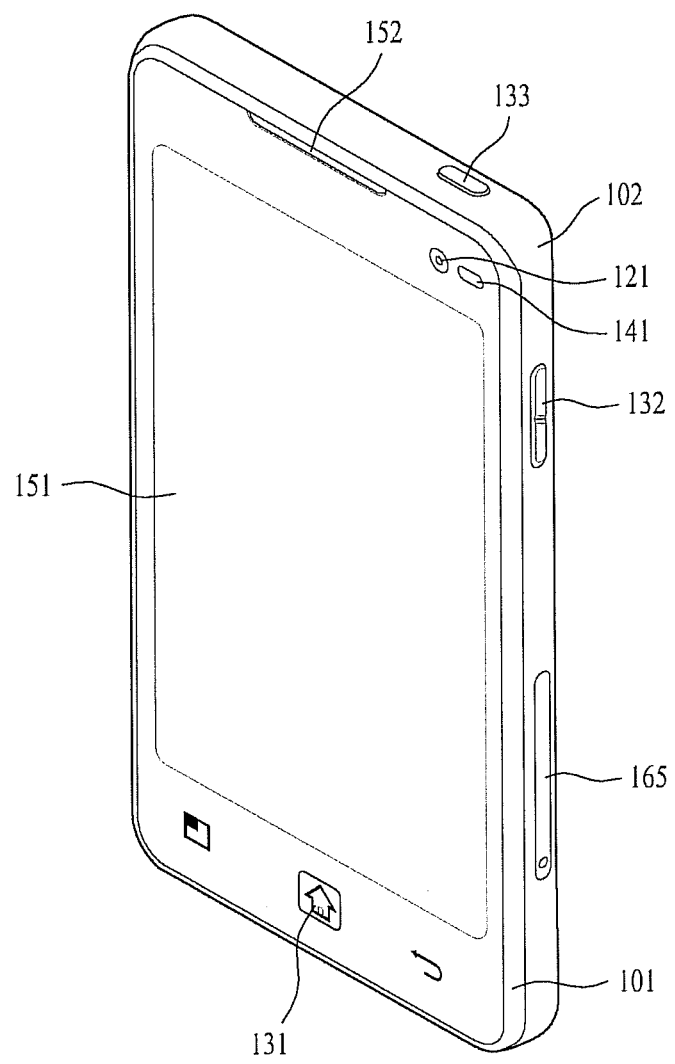
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
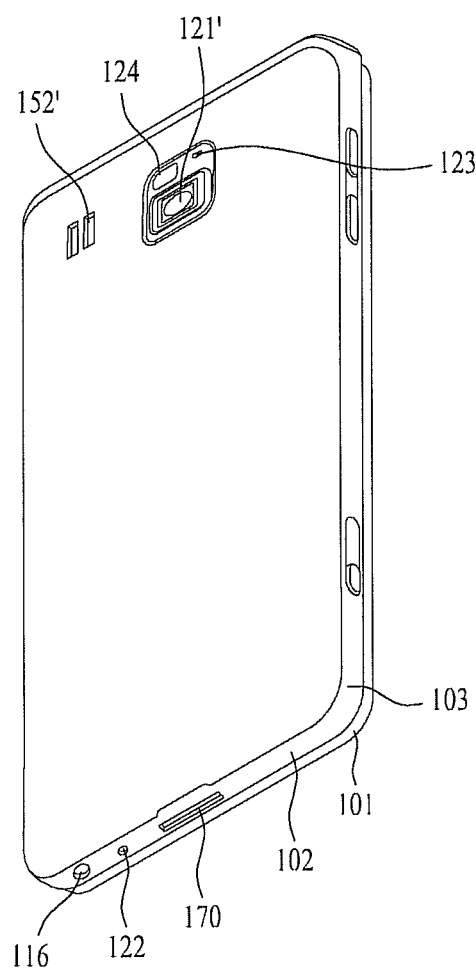
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2 and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Referring to FIGS. 4 to 7*e*, one embodiment of a controlling method realized in the mobile terminal described above will be described as follows.

For explanation sake, it is assumed that the mobile terminal which will be described as follows may include one or more components shown in FIG. 1. Specifically, the mobile terminal according to this embodiment necessarily includes the camera 121, the display 151 and the controller 180 out of the components shown in FIG. 1. According to embodiments, the mobile terminal may further include a position information module 115 and examples of such a position information module 115 include a GPS module. The mobile terminal according to the present invention can be realized more easily in case the display 151 is a touchscreen. Accordingly, it is assumed that the display 151 should be 'touchscreen' in the following specification and drawings.

FIG. 4 is a flow chart illustrating a controlling method of a mobile terminal according to one embodiment of the present invention. FIGS. 5*a* to 5*e* are diagrams illustrating one embodiment of the controlling method shown in the embodiment of FIG. 4.

As shown in FIG. 4, a first input field of a first input mode is displayed on a display 151 of the mobile terminal (S401). An input field refers to a region that allows a user to input data to a mobile terminal and means an interface allowing a user to input data to a mobile terminal. For example, such an input field may include a search box, a message input field provided in a message application implementing screen and a region for inputting various types of information provided in a telephone list application implementing screen.

The input field displayed on the display 151 is configured to have a unique area. In case the user tries to input data to a specific input field, data input operation to the input field can be enabled only in the unique area. The other area of the displayed screen is configured to input no data thereto or to display an icon as a soft key or items irrelevant to the input field.

The input field may be configured to receive data input in a first input mode basically. The first input mode may include a text input mode, a stored-image load mode, a voice input mode, a write input mode and a clipboard paste mode.

The text input mode may be a mode for inputting a text to the input field via a keyboard. The stored image load mode may be a mode for selecting one or more of images stored in a photo album of a mobile terminal and inputting the selected image to an input field as an image. The voice input mode may be a mode for extracting a word or sentence a user speaks via voice recognition and inputting the word or sentence to an input field as text. The write mode may be a mode for inputting a text or image written or drawn by a user's moving a pointer on a touchpad to an input field as text or image. The clipboard paste mode may be a mode for inputting a text or image temporarily stored in a clipboard to an input field.

In the drawings herewith the present specification, it is shown that the first input mode is the text input mode or the stored image load mode and the first input mode is not limited thereto.

Figure 5A:
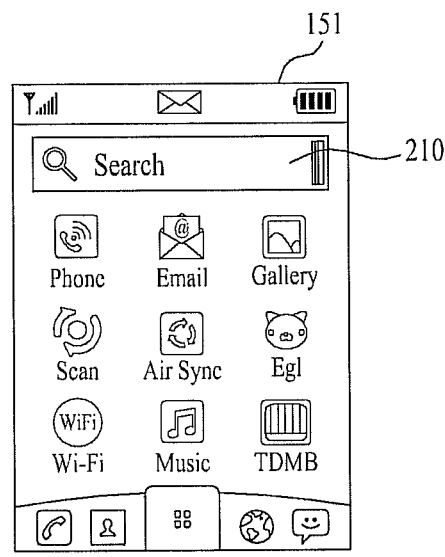
FIGS. 5a to 5e are diagrams illustrating one embodiment of the controlling method shown in the embodiment of FIG. 4.

According to one embodiment, a first input field 210 shown in FIG. 5*a* may be displayed on the display 151 of the mobile terminal. As shown in FIG. 5a, the first input field 210 may be a search box provided in a home screen of a mobile terminal and it may be set to operate in a first input mode basically. The first input mode may be a text input mode and texts may be input to the first input field 210 via a keyboard.

In a state were the first input field in the first input mode is displayed on the display, the first input mode of the first input field may be converted into a second input mode by a user's command (S402). At this time, the user command may be a touch input with a specific pattern or input created by pressing a specific key provided in the mobile terminal or a command input by the user's voice.

When the first input mode of the first input field is converted into the second input mode, an external image is input to the camera 121 (S403) and the controller 180 controls a predetermined part of a preview image of the camera 121 to be displayed in the first input field operating in the second input mode (S404). The preview image of the camera 121 may be an image output in real time from outside via the camera 121.

When the second input mode is activated in the first input field, the preview image of the camera 121 is displayed without screen switching. In other words, once the second input field is activated in the first input field, the preview image may be displayed only on the unique area of the first input field and the other area of the first input field may be displayed in a displayed screen as it is. For example, when the first input field is converted to be in the second input mode in a state an implementing screen of an application having the first input field is maintained, the implemented screen of the application is maintained and the preview image is displayed in the first input field simultaneously.

In case the size of the first input field is changed or the screen is enlarged, which will be described later, the first input field is switched to operate in the second input mode and a predetermined part of the other area possessed by the displayed screen may not be then displayed any longer. In case the screen is reduced, an object not displayed before the input mode switching may be further displayed.

From now on, the mode displaying the preview image in the input field will be referenced to as "real-time capture mode".

Figure 5B:
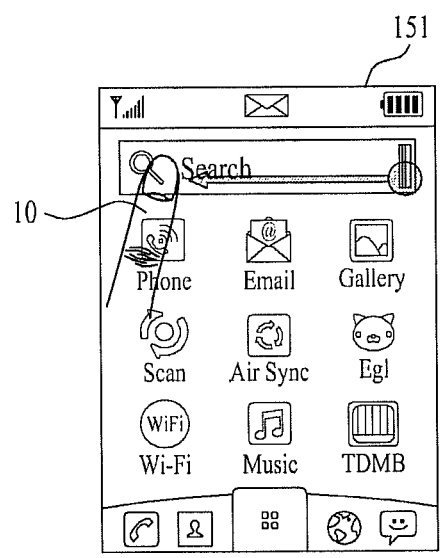

Specifically, as shown in FIG. 5b, touch input with a specific pattern can be implemented on the first input field 210 of the text mode. In response to the user command, the controller 180 converts the input mode activated in the first input field 210 into the real-time capture mode and controls a predetermined part of the preview image of the camera 121 to be displayed in the first input field 210. The first input field 210 of the real-time capture mode is shown in FIG. 5c.

Figure 5C:
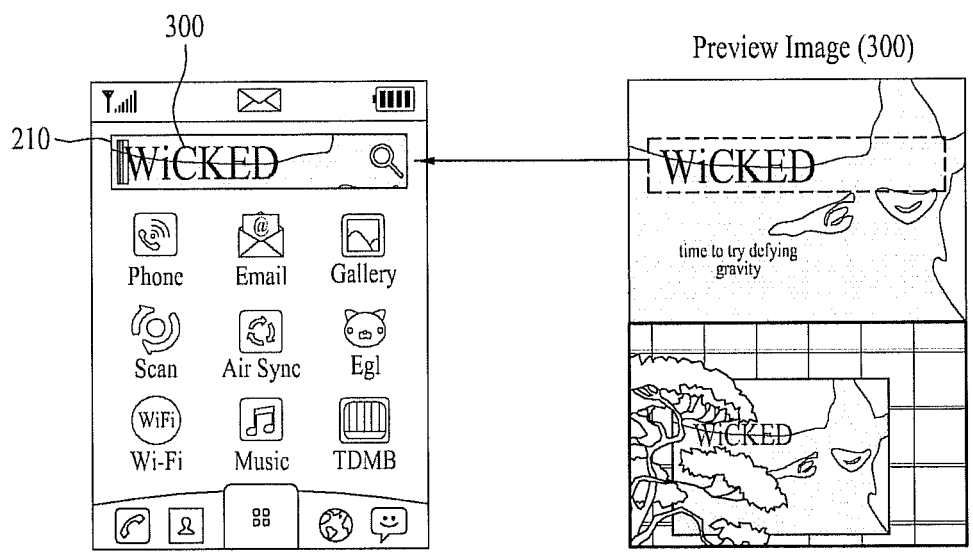

As shown in FIG. 5c, a predetermined part of the preview image 300 may be displayed in the first input field 210 in the real-time capture mode. A right drawing of FIG. 5c shows an overall preview image 300 outputted from the camera 121 and a left drawing of FIG. 5c shows the first input field 210 partially displaying the preview image 300. As shown from the result of comparison between FIGS. 5b and 5c, no screen switching may be generated in the mobile terminal when the mode is converted into the real-time capture mode. In other words, the other area except the unit area of the first input field 210 on the home screen may be still displayed.

In a state of displaying the preview image in the first input field 210, the user may move the mobile terminal and locate a desired area of the preview image 300 in the first input field 210. Accordingly, the user can input the desired area of the image input to the camera 122 to the first input field 210.

Moreover, a zoom level of the image output as the preview image 300 may be different from a zoom level of the preview image displayed in the first input field 210. For example, the preview image displayed in the input field 210 may be enlarged more or reduced more than the image output as the preview image 300.

When the preview image is displayed in the first input field, the preview image may be captured (S405). The image capturing may be operated in response to a user command and the user command may include a touch input with a specific pattern.

Once the preview image is captured, the controller 180 controls a predetermined area of the captured image to be input to the first input field as data (S406).

For example, at least predetermined area of an object possessed by the captured image may be input to the first input field as data. The captured image may include at least one of character and picture objects. When the object provided in the captured image is input as data, the object may be input as data or image data. After data is input to the first input field, the controller 180 may control a screen having the text or image inserted therein to be displayed in the first input field.

According to one embodiment, a character object is provided in the captured image, at least predetermined area of the captured image is input to the first input field and the controller 180 performs character recognition in the captured image. When a text is extracted via the character recognition, the controller 180 may input the extracted text to the first input field as data.

In case the text is input to the first input field as data, the controller may control a screen having the text inserted therein to be displayed on the first input field. Alternatively, the controller 180 may control a screen having the captured image inserted therein to be displayed on the first input field. In this instance, the controller 180 of the mobile terminal processes that the extracted text is inputted to the input field and the captured image may be displayed in the input field even at this time.

Meanwhile, in case a character object is provided in the captured image, the captured image may be input to the first input field as image data. In this instance, an image not a text may be inserted in the first input field and the controller 180 need not perform character recognition in the captured image.

Figure 5D:
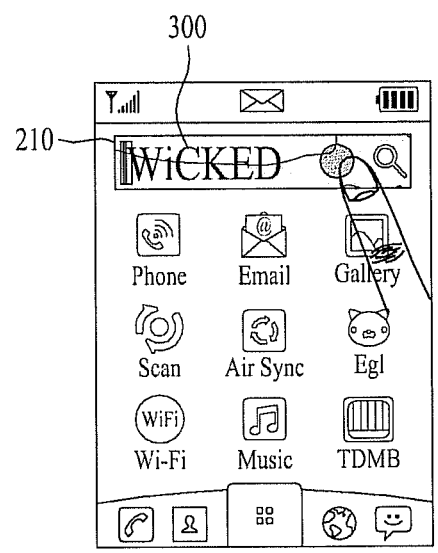

Specifically, as shown in FIG. 5d, the preview image 300 can be captured by the user's touching the first input field 210 displaying the preview image 300. As the preview image 300 is captured, at least predetermined area of the captured image may be input to the first input field 210 as data automatically. As shown in FIG. 5d, a character object showing "WICKED" is provided in the preview image 300 and the controller 180 may perform character recognition to the captured image and can extract a text of "WICKED".

Once extracting the text from the captured image, the controller 180 may input the extracted text to the first input field 210 as text data. The first input field 210 is a search box and a processing command for the input text is input. After that, the controller 180 may perform searching for the text as shown in FIG. 5e and output the result of the searching.

Figure 5E:
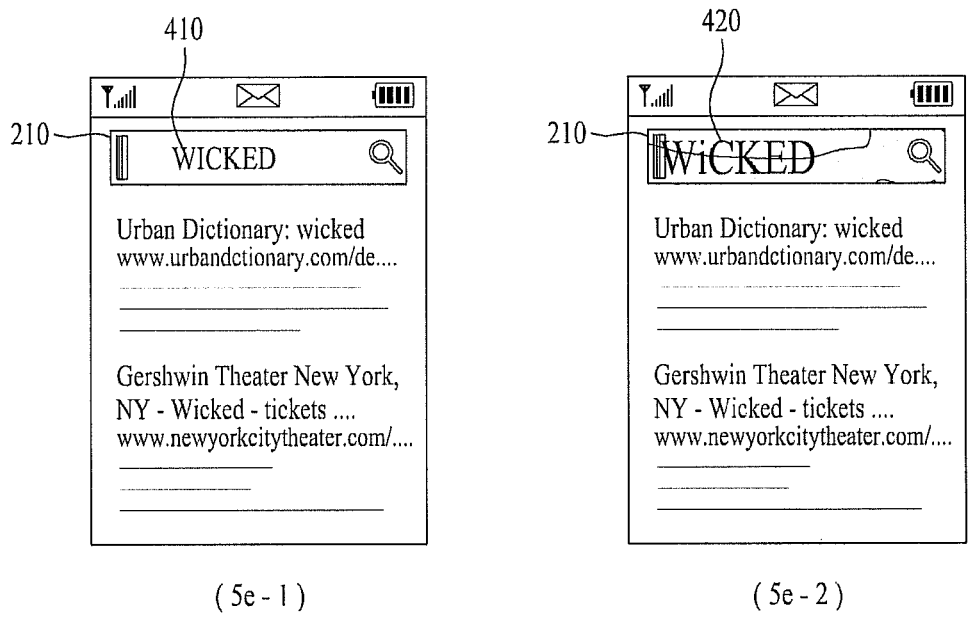

At this time, as shown in FIG. 5e-1, the controller 180 may display the result of the searching for the text of "WICKED" and a first input field 210 having the text 410 of "WICKED" inserted therein together. Alternatively, as shown in FIG. 5e-2, the controller 180 may display a first input field 210 having the image 420 captured from the preview image inserted therein.

According to this embodiment, the user may capture a character or picture provided in a real-time image input from outside via the camera 121 and input the captured character or picture to the input field as data directly. When the real-time capture mode is activated, the preview image of the camera 121 is displayed in the input field, with no screen switching, such that the user can intuitively recognize which input field an object provided in the preview image is input to. In addition, screen switching may be reduced in the data input mode using real-time capture and a battery provided in the mobile terminal can be saved. Also, overload of a processor may be prevented.

FIGS. 6*a* to 6*e* are diagrams illustrating one embodiment of a controlling method according to another embodiment. FIGS. 7*a* to 7*e* are diagrams illustrating one embodiment of a controlling method according to a further embodiment.

According to one embodiment shown in FIGS. 6*a* to 6*e*, the controller 180 may control a first input field in a first input mode and a command icon for inputting a processing command of data input to the first input field to be displayed together. In this instance, as the command icon is touched, the data input to the first input field can be processed according to characteristics of the first input field. For example, in case the first input field is a search box as shown in FIG. 5*e*, the command icon is touched and searching operation for an object input to the first input field can be performed.

In this embodiment, when the first input field is switched from the first input mode into a second input mode, the controller 180 may control a first input field of the second input mode, at least predetermined part of a preview image in the first input field and the command icon to be displayed together. In other words, when a preview image of a camera 121 is displayed in a first input field, with activation of a second input mode, a screen displayed on the display 151 is not switched into another screen and the command icon is displayed as it is.

Figure 6A:
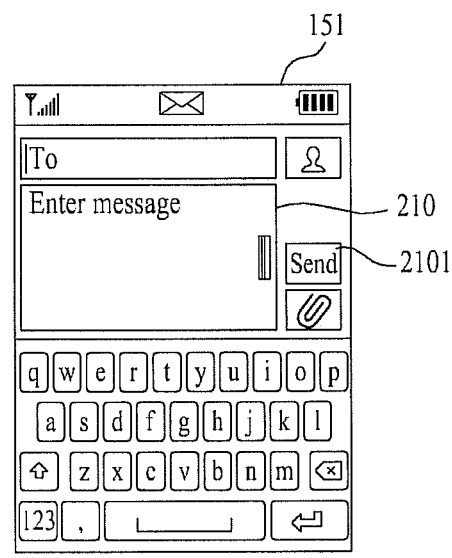

Specifically, as shown in FIG. 6*a*, a first input field 210 configured of a message input field may be provided in a message application implementing screen. A first input mode may be basically activated in the first input field 210 as a text input mode. In case the text input mode is activated, a text may be input to the first input field via a keyboard.

At this time, as shown in FIG. 6*a*, a command icon 2101 configured of "send" icon may be displayed together with a first input field 210 of the text input mode. When the command icon is touched, the controller 180 may transmit data input to the first input field 210 to a person on a contact list as a message.

In the state where a first input field operating in a text input mode is displayed on the display 151, a first input field 210 may be switched from the text input mode into a real-time capture mode that is a second input mode by the user command. When the real-time capture mode is activated, at least predetermined area of a preview image 300 may be displayed in a message input field that is the first input field 210 as shown in FIG. 6*c*.

Figure 6B:
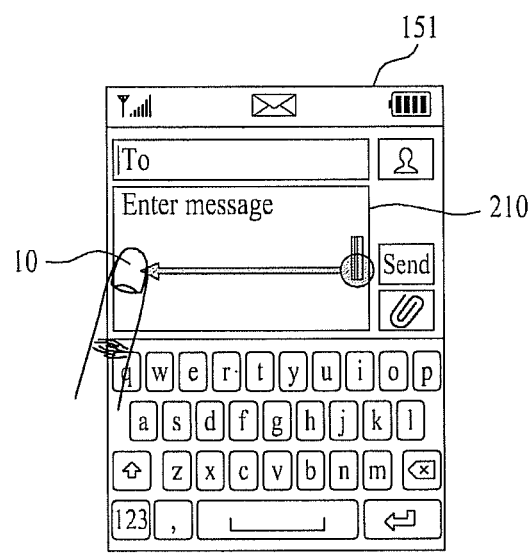
Figure 6C:
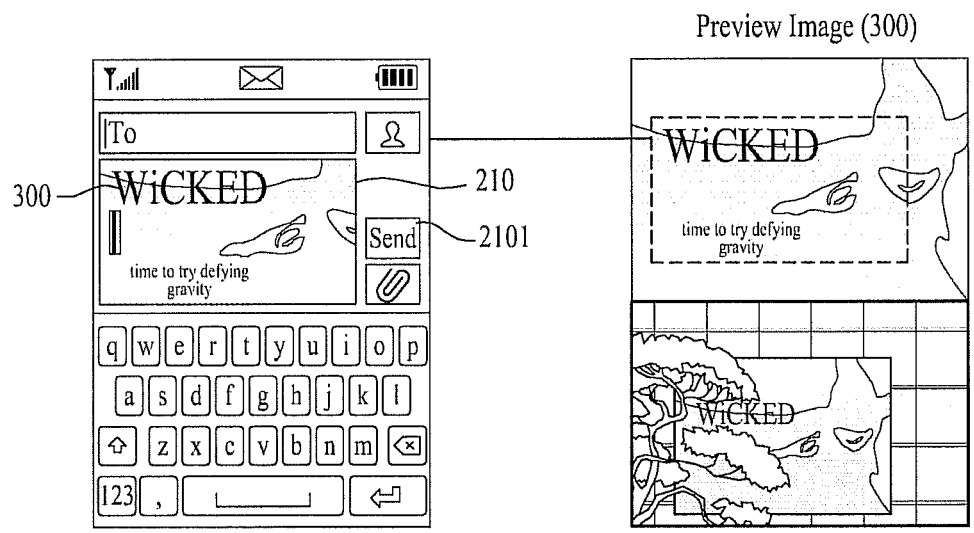
Figure 6D:
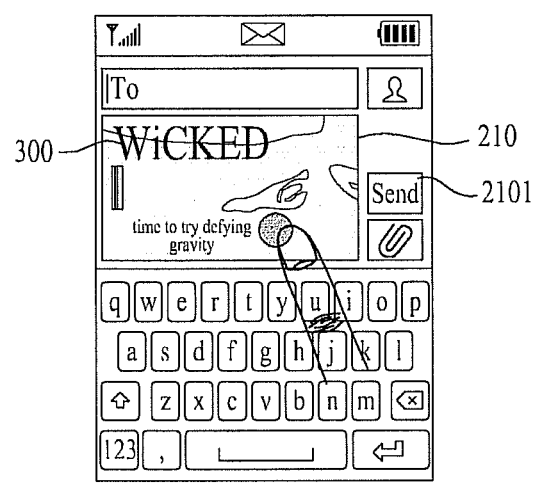

At this time, as shown in FIG. 6*c*, a command icon 2101 displayed together with a first input field 210 of a text input mode may be displayed, together with a preview image 300 in the first input field 210. In other words, when the preview image 300 is displayed on the first input field 210, "send" icon 2101 that is another element composing the implementing screen of the message application is still displayed.

In the state where the preview image is displayed in the first input field, the user touches a first input field 210 having the preview image 300 displayed thereon and the preview image 300 can be captured. As the preview image 300 is captured, at least predetermined area of the captured image may be automatically input to the message input field 210 as data.

At this time, as shown in FIG. 6*e*-1, the controller 180 may perform character recognition in the captured image and extract texts of "WICKED" and "time to try defying gravity", such that it may input the extracted texts to the message input field 210 as data. In this instance, when the user touches "send" icon, a message including the phrase may be transmitted to the person desired to send a message.

Alternatively, as shown in FIG. 6*e*-2, the controller 180 may input the captured image 420 to the message input field 210 as image. In this instance, when the user touches "send" icon, a message having an attached file that is the extracted text may be transmitted to the person desired to send a message.

According to another embodiment, as shown in FIGS. 7*a* to 7*e*, a second input field in a first input mode may be further displayed on the display 151. In other words, a plurality of input fields may be displayed on the display 151. The second input field is separate from the first input field and it has a unique area that is different from the unique area of the first input field. Different data may be input to the first input field and the second input field.

Moreover, a first input mode of the second input field may be identical to or different from the first input mode of the first input field. For example, the first input mode of the first input field and the first input mode of the second input field may be text input modes. Alternatively, the first input mode of the first input field may be a text input mode and the first input mode of the second input field may be a stored image load mode.

In this embodiment, when the first input field is switched from the first input mode into the second input mode, the controller 180 may control a first input field operating in a second input mode that displays at least predetermined area of a preview image of the camera 121 to be displayed together with a second input field operating in the first input mode. In other words, when the input mode is switched in the first input field, the input mode is not switched in the second input field. In addition, when the preview image of the camera 121 is displayed in the first input field by the activation of the second input mode in the first input field, the screen displayed on the display 151 is not switched into another screen and the second input field operating in the first input mode may be displayed as it is.

Figure 7A:
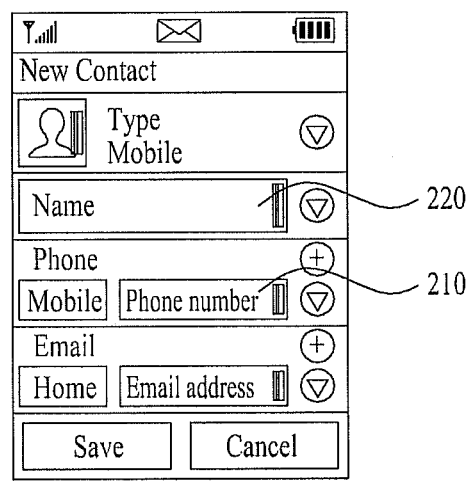
FIGS. 7a to 7e are diagrams illustrating one embodiment of a controlling method according to a further embodiment.

Specifically, as shown in FIG. 7*a*, an implementing screen of a contact list application may include a first input field 210 configured to input a telephone number and a second input field 220 configured to input a name together. A first input mode that is a text input mode may be activated in the first input field 210 and the second input field 220. The text input mode is activated, texts may be input to the first input field 210 and the second input field via a keyboard.

In the state where a first input field 210 and a second input field 220 are displayed on the display 151, only the first input field 210 can be switched to be in a real-time capture mode that is a second input mode. When the real-time capture mode is activated, at least predetermined area of a preview image 300 may be displayed in the first input field 210 as shown in FIG. 7*c*.

Figure 7B:
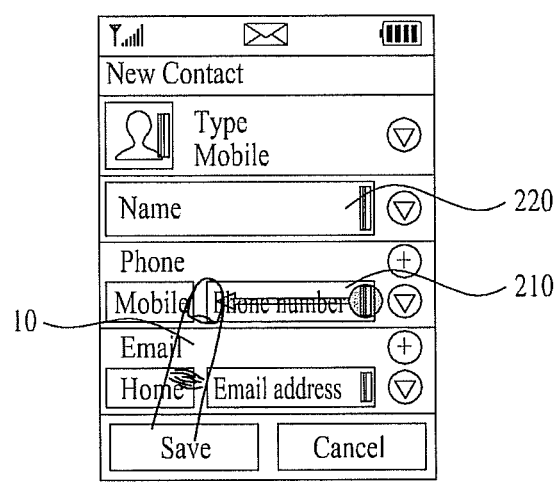
Figure 7C:
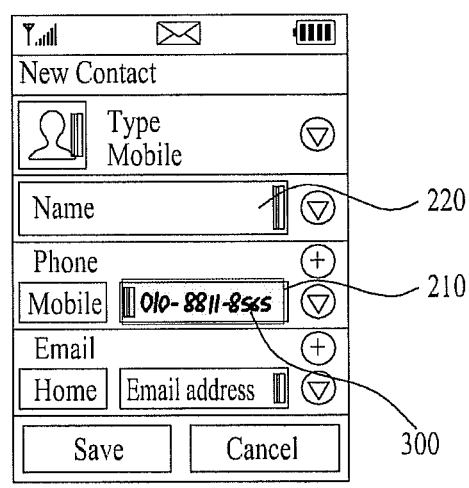

At this time, as shown in FIG. 7*c*, a second input field 220 in a text input mode may be displayed, together with the preview image 300 of the first input field 210. In other words, when the preview image 300 is displayed in the first input field 210, an implementing screen of a contact list application is not switched into another screen and a second input field 220 that is another element composing the implementing screen of the contact list application may be still displayed in a state of not switching an input mode.

Figure 7D:
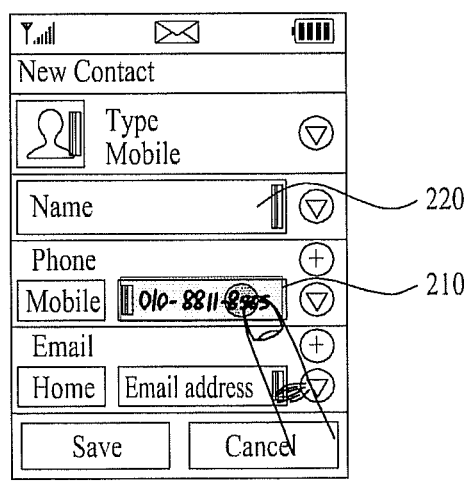
Figure 7E:
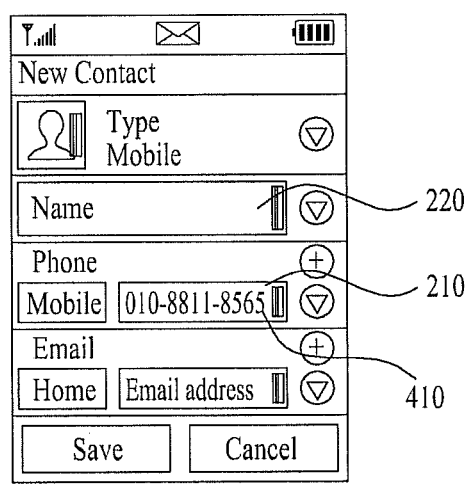

When the user touches the first input field 210 displaying the preview image 300 as shown in FIG. 7d, the preview image 300 can be captured and the controller 180 may perform character recognition in the captured image. A text of "010-8811-8565" is extracted and the extracted text is input to the message field 210 as data.

The operation of the mobile terminal is described above, in case the real-time capture mode according to the present invention is activated in the input field. Specific operations of the mobile terminal associated with specific operations and related embodiments will be described as follows.

Various embodiments of a method for switching an input mode of an input field described in the embodiment mentioned above will be described as follows, referring to FIGS. 8 and 9.

Figure 8:
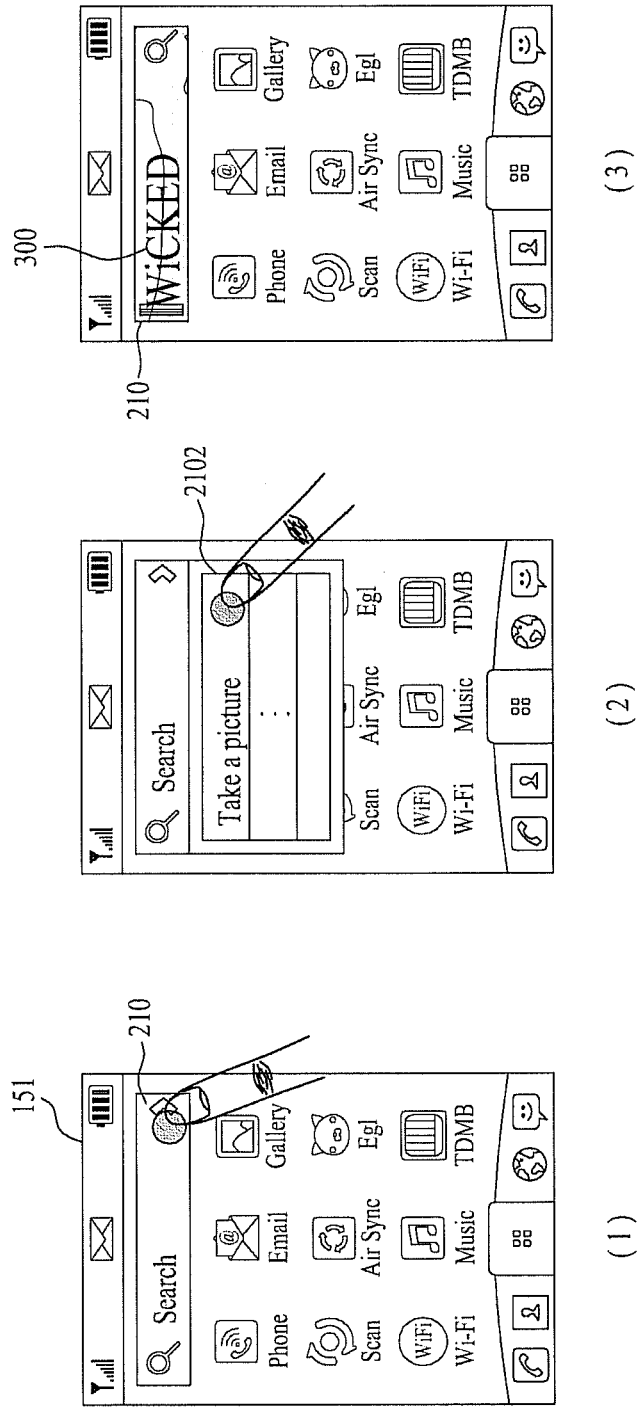
FIG. 8 is a diagram illustrating one embodiment of a first user command for switching an input mode of a first input field.

FIG. 8 is a diagram illustrating one embodiment of a first user command for switching an input mode of a first input field. FIG. 9 is a diagram illustrating one embodiment in case a first input mode is switched into a third input mode in the first input field based on a second user command.

According to one embodiment shown in FIG. 8, the first user command may be the operation allowing the user to select a specific item from a menu for selecting an input mode.

Specifically, as shown in FIG. 8 (1), a first input field 210 operating in a first input mode may be displayed on the display 151. When the user touches the first input field 210, a menu 2102 allowing the user to select an input mode may be displayed as shown in FIG. 8 (2). The menu 2102 may be extended from the first input field 210 and it may include one or more items corresponding to one or more input modes.

When the user selects an item of "take a picture" from the menu 2102, the controller 180 may control a first input mode implemented in the first input field 210 to be switched into a second input mode. As shown in FIG. 8 (3), the input mode of the first input field 210 is switched into a second input mode and at least predetermined area of a preview image 300 provided in the camera 121 may be displayed in the first input field 210.

According to another embodiment, as shown in FIGS. 5b, 6b and 7b, the controller 180 may control the first input mode in the first input field 210 to be switched into the second input mode, when detecting the first user command 10. At this time, the first user command 10 may be a touch drag input implemented from an end of the first input field 210 along a longitudinal direction of the first input field 210. For example, as shown in FIGS. 5b, 6b and 7b, the touch drag input 10 of the first user command may be implemented from a right end of the first input field 210 toward a left end along a longitudinal direction of the first input field 210.

The touch drag input of the first user command may be connected from one end of the first input field to the other end of the first input field. In addition, while the touch drag input is implemented from one end of the first input field toward the other end, a predetermined area of a preview image of the camera 121 may be immediately displayed in an area of the first input field where the touch drag input is already implemented. As the touch drag input is getting progressed toward the other end of the first input field, the area displaying the preview image is getting enlarged in the first input field along a pointer performing the touch drag input.

According to a further embodiment, the controller 180 may control a first input mode in a first input field to be switched into a third input mode, when detecting a second user command. At this time, the first input mode may include at least one of a text input mode, a stored-image load mode, a voice input mode, a write input mode and a clipboard paste mode.

If the first user command is the touch drag input implemented from one end of the first input mode along a longitudinal direction, the second user command may be a touch drag input implemented from the other end of the first input field along a longitudinal direction of the first input field. In other words, the second user command may be a touch drag input implemented in the reverse direction with respect to the touch input of the first user command. In this instance, when the touch drag input is implemented in one direction in a state of displaying the first input field in the first input mode, the input mode of the first input field is switched into the second input mode. When the touch drag input is implemented in the reverse direction, the input mode of the first input field may be switched into the third input mode.

Specifically, as shown in FIG. 9 (a), the first input field 210 operating in the first input mode may be displayed on the display 151. In this state, a touch drag input 20 starts from a left end of the first input field 210 toward a right end along the longitudinal direction of the first input field 210, to be implemented as a second user command. The touch drag input 20 of the second user command may be progressed in the reverse direction, compared with the touch drag input 10 of the first user command shown in FIG. 5b.

In response to the second user command, the controller 180 may switch the input mode of the first input field 210 into a third input mode.

According to one embodiment, as shown in FIG. 9 (31), the third input mode may be a voice input mode. In this instance, the user speaks a word or sentence and then the mobile terminal performs voice recognition such that the word or sentence may be input to the first input field 210 as data.

According to another embodiment, as shown in FIG. 9 (3-2), the first input mode may be a write input mode. In this instance, the user moves a pointer on a touchscreen to write characters and the written characters may be input to the first input field 210 as data. At this time, it is preferred that a touch input for inputting the written character is directly implemented on the first input field 210.

According to a further embodiment, as shown in FIG. 9 (3-3), the third input mode may be a clipboard paste mode. In this instance, the user may input a text or image copied in a clipboard to the first input field 210.

According to this embodiment, the user can simply change an input mode of an input field by using a simple touch drag input. Together with that, a direction of a touch drag input can be changed and the input mode can be switched into various input modes.

Figure 10:
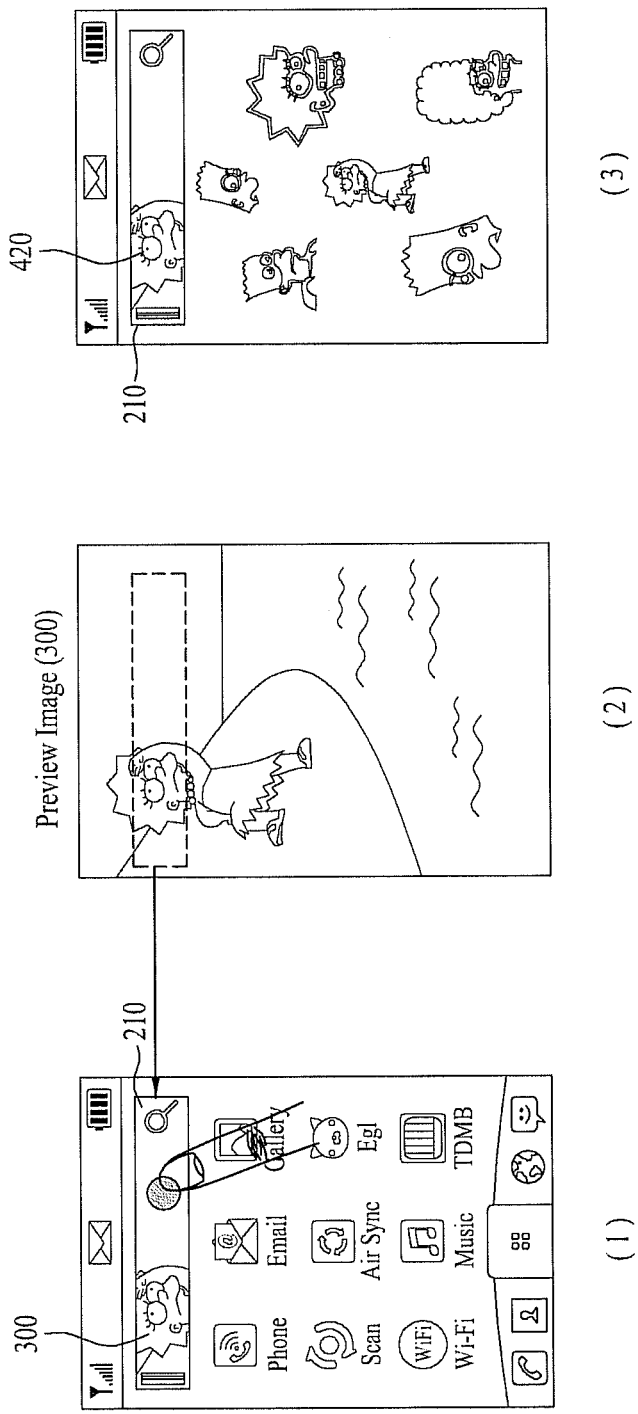
FIG. 10 is a diagram illustrating one embodiment of a method for processing data when a predetermined part of a captured image is input to a first input field as data.

Referring to FIGS. 10 and 11, embodiments associated with a method for processing data input by capturing an image in a real-time capture mode will be described as follows.

FIG. 10 shows that a first input field is a search box and one embodiment of a method for performing search for an object after an object provided in a captured image is input to a first input field.

According to one embodiment, a first input field is a search box and the controller 180 may control the result of search for an object provided in a captured image to be displayed, when at least predetermined area of an image captured from a preview image displayed in the search box. For that, the controller 180 may perform search for the object provided in the captured image. The controller 180 may perform the searching based on data stored in the mobile terminal or via a web connected thereto. In the latter case, the controller 180 may implement a web browser application to perform the searching.

In one embodiment, the controller 180 of the mobile terminal according to the embodiment may perform image search on a picture object provided in the captured image. In this instance, the captured image may be input to the first input field as image data.

Specifically, as shown in FIG. 10 (*a*), a real-time capture mode is activated in the first input field 210 configured of a search box and a preview image 300 of the camera 121 is then displayed in the search box 210. When the user touches the search box 210, the preview image 300 displayed in the search box 210 may be captured.

The captured image may be input to the search box 210 as image data. When the captured image is input, the controller 180 may search an image similar to the picture object provided in the captured image on the web. After that, the controller 180 may control the result of the search to be displayed as shown in FIG. 10 (2).

According to one embodiment, the controller 180 of the mobile terminal according to the embodiment may perform search for a character object provided in the captured image. In this instance, the controller 180 may perform character recognition in the captured image and a text extracted by the character recognition may be input to the first input field as text data. A detailed operation in case the captured image includes the character object is shown in FIGS. 5*a* to 5*e*.

According to one embodiment, when performing the search for the object provided in the captured image, the controller 180 may perform search for the object based on location information of the mobile terminal. For that, the mobile terminal may further include a location information module 115 having a GPC module. The location information of the mobile terminal can be acquired via the GPS module.

When acquiring the location information of the mobile terminal, the controller 180 may perform search for the object based on the location of the mobile terminal. For example, in case the object is a picture object showing the landscape, the controller 180 can search only images showing the landscapes within a preset distance based on the acquired location of the mobile terminal when searching images similar to the picture object. In other words, the controller 180 may control the acquired location information to be inputted as a type of a restricted condition when performing the search.

Similar to the embodiments described above, the first input field is a search box and the data input via the real-time capture mode is processed as a search object, such that the user can photograph an outside character or picture to search for the photographed image. Accordingly, the user need not input a search word as text data to search the outside character or picture. Also, the user need not photograph the character or picture and store the photographed image separately, such that user convenience may be enhanced.

Meanwhile, FIG. 11 is a diagram illustrating another embodiment of the method for processing the data when a predetermined part of a captured image is input to a first input field as data.

According to one embodiment, the controller 180 performs character recognition in a character object provided in a captured image of a preview image and controls an implementing screen of an application connected with a type of information acquired from a text extracted by the character recognition to be displayed automatically. At this time, the controller 180 may control the extracted data to be inputted to a third input field provided in the displayed application implementing screen as data automatically.

The types of the information acquired by the texts extracted via the character recognition may include the data, the time and telephone numbers. The controller 180 may analyze the text extracted from the captured image to determine the type of the information possessed by the extracted text. For that, the controller 180 may have access to a database where text information modules corresponding to information types. A specific application may be connected with each of the information types. For example, a type of information showing the data may be connected with a calendar application or a type of information showing telephone numbers may be connected with a contact list application.

Once determining the type of the information possessed by the extracted text, the controller 180 may implement an application connected with the determined type of the information automatically and output an implementing screen of the application. Together with that, the controller 180 may control the extracted text to be inputted to the first input field provided in the application implementing screen as text data.

Specifically, as shown in FIG. 11 (1), the real-time capture mode is activated in the first input field 210 and a preview image 300 of the camera 121 may be displayed in the search box 210. At this time, the preview image 300 may include a character object ("October 31") that is the information type showing the date.

As shown in FIG. 11 (2), when the user touches the search box 210, the preview image 300 displayed in the search box 210 may be captured. At this time, as shown in FIG. 11 (2), the first input field 210 may be the search box and an auxiliary icon 2103 for commanding implementation of a connected application may be displayed together with the search box 210. In this instance, when the user touches the icon 2103, the preview image 300 may be captured and the linked application may be implemented automatically.

The controller 180 may perform character recognition for the captured image and extract a text of "October 31". As the extracted text indicates the information type showing the date, the controller 180 may implement the application linked to the information type of the date automatically and then display an implementing screen 500 of the application as shown in FIG. 11 (3). It is shown in FIG. 11 (3) that the application linked to the information type of the date is a calendar application.

As the calendar application implementing screen 500 is displayed, the controller 180 may input the extracted text of "October 31" to a third input field 230 provided in the screen 500 as data. In addition, as shown in FIG. 11 (3), the date indicated by the extracted text may be inputted according to a module of the calendar application.

According to this embodiment, when the user photographs an outside character, a linked application may be automatically implemented, such that the process of inputting texts to an input field provided in an application separately, after the user implements a connected application, may be omitted.

Referring to FIGS. 12 to 18, various embodiments that is able to be realized by a mobile terminal configured to display a preview image in an input field will be described as follows.

For explanation sake, the drawings show that an input field activating a real-time capture mode is a search box displayed in a home screen of a mobile terminal. However, the embodiments which will be described later are not limited to search box input fields and applicable to all types of editable input fields, except the search box.

Figure 12:
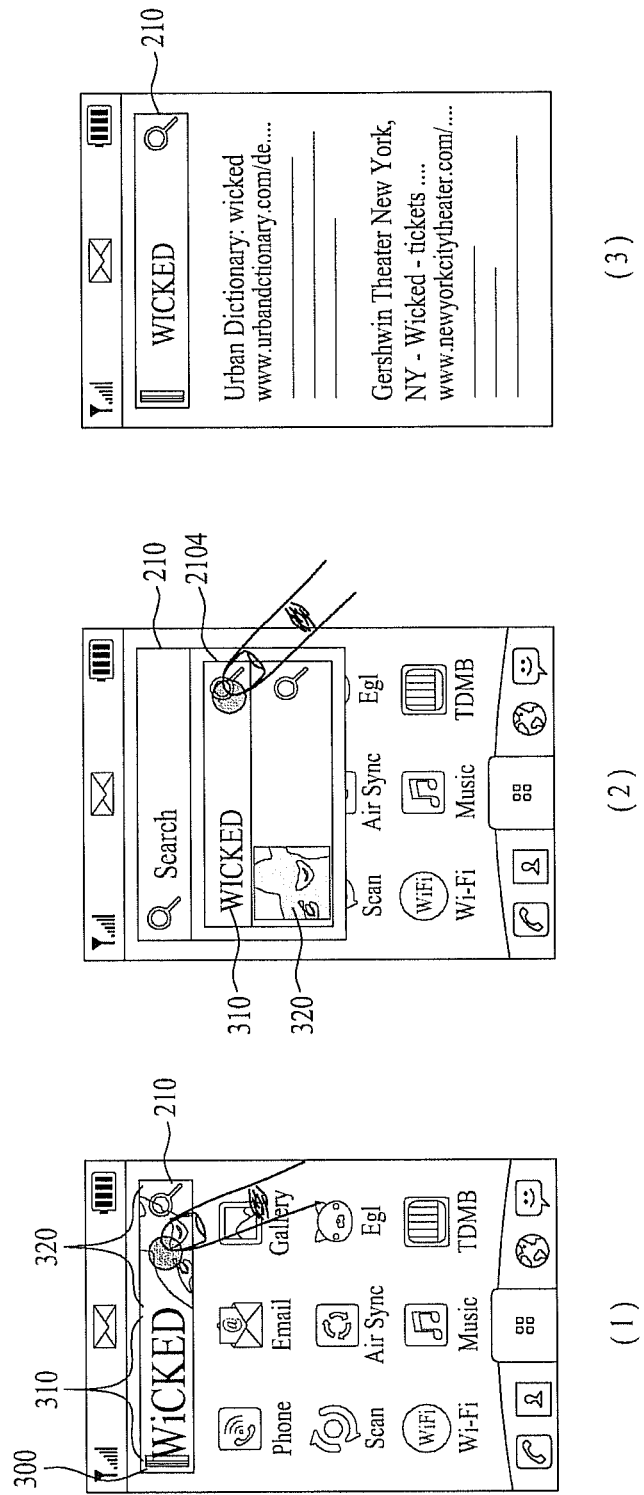
FIG. 12 is a diagram illustrating one embodiment of a method for operating a mobile terminal in case a plurality of objects are provided in an image captured from a preview video file displayed on a first input field.

FIG. 12 is a diagram illustrating one embodiment of a method for operating a mobile terminal in case a plurality of objects are provided in an image captured from a preview video file displayed on a first input field.

According to one embodiment, as the preview image is captured, the controller 180 automatically controls a character object and a picture object provided in the captured image to be displayed separately and controls one of the separated objects selected by the user to be inputted to the first input field as data.

For that, the controller 180 may perform character recognition in the captured image as the preview image is captured. In case a text is extracted by the character recognition, the controller 180 may distinguish an area of the captured image having a character recognized from the other area having a character not recognized. At this time, the controller 180 may determine that the area of the captured image having the character recognized is a character object and that the other area having not character recognized is a picture object.

Hence, the controller 180 may control the character object and the picture object to be displayed separately. Instead of the character object, a text extracted by the character recognition may be displayed. When the user select one of the character and picture objects displayed separately, the controller 180 may control the selected object to be inputted to the first input field as data. It is preferred that the character object is inputted as text data extracted during the character recognition and that the picture object is inputted as image data.

Specifically, as shown in FIG. 12 (1), the real-time capture mode may be activated in the first input field 210 and the preview image 300 of the camera 121 may be then displayed in the first input field. At this time, the preview image 300 may include a character object 310 and a picture object 320. When the user touches the first input field 210, the preview image 300 displayed in the first input field 210 may be captured.

As the preview image 300 is captured, the controller 180 may perform the process of distinguishing the character object 310 from the picture object 320 in the captured preview image. After that, as shown in FIG. 12 (2), the controller 180 may display the character object 310 and the picture object 320 separately. At this time, as shown in FIG. 12 (2), the character object 310 and the picture object 320 may be arranged in an object list 2104 extended from the first input field 210. In addition, the character object 310 may be displayed as a text extracted via the character recognition.

As shown in FIG. 12 (2), when the user selects one item from the object list 2104, the controller 180 may input an object 310 provided in the selected item to the first input field 210 as data. The controller 180 performs searching for the input data according to a unique characteristic of the first input field 210 that is a search box and may display the result of the search for "WICKED" that is the character object 310 as shown in FIG. 12 (3).

According to this embodiment, when a plurality of objects are provided in the captured image in the first input field, the user can select an object desired to input. Accordingly, the usability of the mobile terminal can be enhanced.

Figure 13:
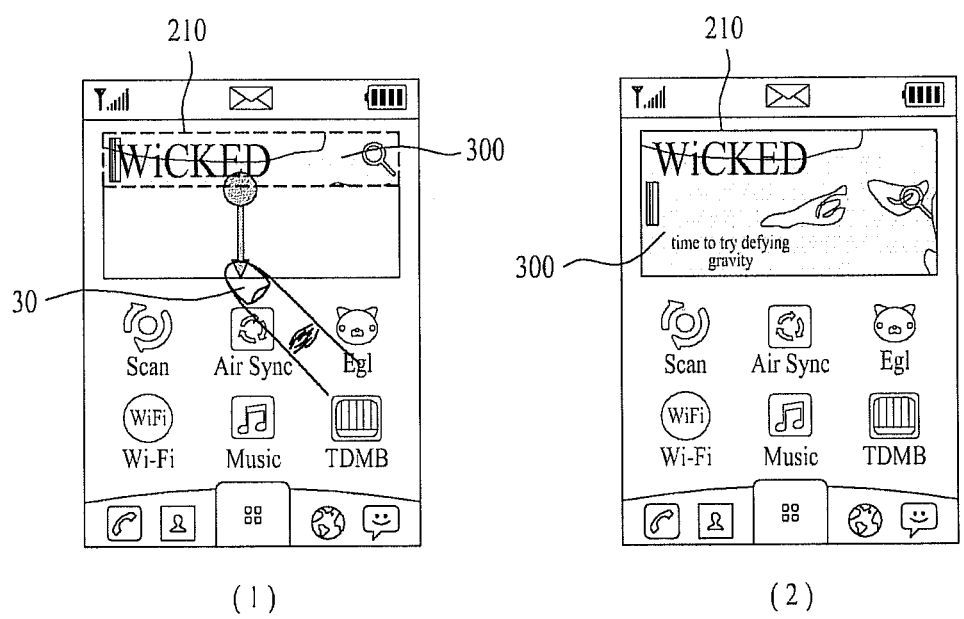
FIG. 13 is a diagram illustrating one embodiment in case the size of the first input field is changed by a user command.

FIG. 13 is a diagram illustrating one embodiment in case the size of the first input field is changed by a user command.

According to one embodiment, when detecting a third user command, the controller 180 may control the size of a first input field to be changed and displayed. At this time, the third user command may be a touch input with a specific pattern. It is preferred that the third user command is a touch drag input progressing from a boundary of the first input field toward an outer area of the first input field.

When the size of the first input field is changed by the third user command, the controller 180 may control at least predetermined area of a preview image of a camera 121 to be displayed in the first input field with the changed size. When the user changes the size of the first input field to enlarge the first input field, an area of the preview image of the camera 121 displayed in the first input field may be enlarged.

Alternatively, when the user enlarges the first input field, the preview image displayed in the first input field may be enlarged and displayed according to the changed size. In this instance, even after the size of the first input field is enlarged, the area of the camera preview image displayed in the first input field is not enlarged.

Specifically, as shown in FIG. 13 (1), the user may perform the touch drag input 30 from the boundary of the first input field 210 as the third user command, in the state where the preview image 300 is displayed in the first input field 210. In response to the third user command, the controller may control the size of the first input field 210 to be increased.

As shown in FIG. 13 (2), as the size of the first input field 210 is getting increased, the area of the preview image 300 of the camera 121 displayed in the first input field 210 may be enlarged. Although only an object of "WICKED" is provided in the preview image 300 in the first input field 210 as shown in FIG. 13 (1), an object of "It's time to try defying gravity" may be further provided in the preview image 300 in the first input field 210. Alternatively, as shown in FIG. 13 (2), the preview image having an enlarged object of "WICKED" may be displayed in the first input field 210.

According to this embodiment, the user can change the size of the first input field freely, only to adjust the size or ratio of the preview image displayed in the first input field. In addition, the user increases the size of the first input field, to enable an entire area of an outside object that is desired to capture to be displayed in the first input field.

FIG. 14 is a diagram illustrating one embodiment increase the size of the first input field is automatically changed according to the size of an object in a preview video file.

According to one embodiment, the controller 180 may control the size of the first input field to be automatically changed and displayed such that an overall area of at least one of objects provided in a preview image of the camera 121 may be arranged in the first input field. At this time, the overall area of each object may be defined by an outline of one character string or picture. In addition, the controller 180 may recognize characters composing one character string as one object.

In this embodiment, the controller 180 may determined whether the overall area of at least one of objects provided in the preview image displayed in the first input field is arranged in the first input field. For that, the controller 180 may recognize an outline of each object provided in the preview image to determine whether an entire area of the outline defining one object is arranged in the first input field. The controller 180 may analyze whether the outline of one object interferes with an outline of the first input field. In case two outlines interfere with each other, the controller may determine that the entire area of the corresponding one object is not arranged in the first input field.

When determining that there is no object having the overall area arranged in the first input field out of the objects provided in the preview image, the controller 180 can change the size of the first input field. It is preferred that the controller 180 increases the size of the first input field to arrange the overall area of at least one object in the first input field. Once the size of the first input field is increased sufficient to arrange the overall area of at least one object in the first input field, the controller 180 may stop changing the size of the first input field.

In case a plurality of objects are provided in the preview image, the controller 180 determines whether the overall area of one object is arranged in the first input field. When determining that the overall area of one object is arranged in the first input field, the controller 180 may not change the size of the first input field.

Specifically, as shown in FIG. 14 (1), a character object 310 of "WICKED" provided in the preview image 300 displayed in the first input field 210 may have the size larger than the size of the first input field 210. Accordingly, the overall area of the character object of "WICKED" is not arranged in the first input field 210. In this instance, the controller 180 checks whether an outline of the character object 310 interferes with an outline of the first input field 210 such that it can determine that the overall area of the character object 310 is not arranged in the first input field 210.

After determining that the overall area of the character object 310 is not arranged in the first input field 210, the controller 180 may automatically increase the size of the first input field 210 as shown in FIG. 14 (2). As shown in FIG. 14 (2), the controller 180 may increase the size of the first input field 210 until the overall area of the character object 310 of "WICKED" can be arranged in the first input field 210.

According to this embodiment, the size of the first input field can be changed according to the size of the object provided in the preview image automatically, without the user's auxiliary operation. Accordingly, the user can capture an overall area of an outside object photographed by the camera 121 simply to input the object to the first input field as data.

FIG. 15 is a diagram illustrating one embodiment in case a preview video file is automatically zoomed in or out according to the size of an object in the preview video file.

According to one embodiment, the controller 180 may control the preview image to zoom out automatically before displayed, so as to arrange an overall area of at least one of objects provided in a preview image of the camera 121 in the first input field. For that, the controller 180 may determine whether the overall area of the at least one object provided in the preview image is arranged in the first input field. A detailed method of the determination is mentioned above and will be omitted accordingly.

Once determining that there is no object having the overall area arranged in the first input field out of the objects displayed in the preview image, the controller 180 may control the camera 121 to zoom out the preview image. As the preview image is zoomed out, objects located in the preview image may be getting smaller. The controller 180 may control the preview image to be zoomed out to arrange an overall area of at least one object in the first input field. When the sizes of the objects located in the preview image are getting smaller sufficient to arrange the overall area of at least one object in the first input field, the controller 180 may stop the zoom-out of the preview image.

In one embodiment, as shown in FIG. 15 (1), the size of a character object 310 of "WICKED" provided in the preview image 300 displayed in the first input field 210 is larger than the size of the first input field. In this instance, as shown in FIG. 15 (2), the controller 180 may automatically zoom out the preview image 300 to arrange the overall area of the character object 310 of "WICKED" in the first input field 210.

According to this embodiment, the size of the object provided in the preview image may be automatically changed according to the size of the object, without the user's auxiliary operation. Accordingly, the user may capture the overall area of the outside object photographed by the camera 121 simply and input the captured area to the first input field as data.

According to another embodiment, the controller 180 may control the preview image to be zoomed in or out before displayed, in response to the user command. At this time, the controller 180 may zoom in or out the preview image with respect to the one selected by the user command out of the objects provided in the preview image.

The controller 180 may zoom in or zoom out the preview image, to arrange the overall area of the object selected by the user in the first input field. Alternatively, the controller 180 may zoom in the preview image, to make the first input field with the object selected by the user. In the latter case, the controller 180 may zoom in the preview image until an outline of the selected object contacts with a boundary of the first input field.

As a result, the size of the object provided in the preview image may be automatically changed to display the object selected by the user in the first input field, with an optimized size, such that the user can capture the image of the outside object more efficiently to input the captured image to the first input field as data.

FIG. 16 is a diagram illustrating one embodiment of a method for capturing a preview image displayed in the first input field.

According to one embodiment, in case the first user command for switching the input mode of the first input field into a real-time capture mode is a touch drag input performing in a longitudinal direction of the first input field, the controller 180 may control the camera 121 to capture a preview image in the first input field automatically when the touch drag input reaches the other end of the first input field. For that, the controller 180 may detect a position of a pointer performing the touch drag input and transmit a command to the camera 121 to capture the preview image, when determining that the detected position of the pointer is overlapped with the other end of the first input field.

As mentioned above, the touch drag input of the first user command may be connected from one end to the other end of the first input field. At this time, an area of the preview image of the camera 121 may be immediately displayed in an area of the first input field where the touch drag input is already performed, while the touch drag input is progressing.

In this embodiment, the user can identify a figure of an object desired to capture via the preview image displayed in the area where the touch drag input is already performed during the progress of the touch drag. The user may capture the preview image displayed in the first input field by performing the touch drag input to the opposite end of the first input field.

Specifically, as shown in FIG. 16 (1), a touch drag input 10 of a first user command may be performed to for switch the input mode of the first input field 210 where a text mode is activated into a real-time capture mode. The touch drag input 10 may progress from a right end to a left end of the first input field 210.

At this time, as shown in FIG. 16 (1), as the touch drag input 10 is progressing from the right end to the left end, a predetermined area of the preview image 300 may be immediately displayed in the area where the touch drag input 10 is already performed.

As the touch drag input 10 is progressing to the left end, an area of the preview image 300 may be enlarged leftward in the first input field 210.

As shown in FIG. 16 (2), when the pointer reaches the left end of the first input field 210 with the progress of the touch drag input, the controller 180 may automatically capture the preview image 300 displayed in the first input field 210. As the preview image 300 is captured, the controller 180 may perform character recognition in the preview image 300 and input a text of "WICKED" extracted by the character recognition to the first input field 210 as data. In the drawings, the first input field 210 is a search box and the controller 180 performs searching for the text of "WICKED" as shown in FIG. 16 (3), only to display the result of the searching on a screen.

According to this embodiment, the user can capture the preview image displayed in the first input field by using the user command configured to switch the input mode of the first input field into the real-time capture mode, such that the usability of the mobile terminal can be enhanced.

According to another embodiment, the controller 180 may control the camera 121 to capture the preview image automatically, when the overall area of the character object provided in the preview image is arranged in the first input field.

For that, the controller 180 may determine whether the overall area of the character object provided in the preview image is arranged in the first input field and a detailed method thereof is already described, only to be omitted. When determining that the overall area of the character object is arranged in the first input field, the controller 180 may transmit a command for capturing the preview image to the camera 121. In this embodiment, the character object may mean character strings in which one or more characters are aligned.

According to this embodiment, when detecting that the touch drag input finishes in the first input field, in case the first user command for switching the input mode of the first input field into the real-time capture mode is a touch drag input performed in a longitudinal direction of the first input field, the controller 180 may control the first input field to be split into a first sub input field and a second sub input field. At this time, an input mode of the first or second sub input field may be switched into the second input mode by the first user command.

In this embodiment, the controller 180 may control the input mode of the overall first input field to be switched from the first input mode into the second input mode, only when the touch drag input performed by the first user command is continuously performed from one end to the other end of the first input field. In case the touch drag input finishes in an unique area of the first input field, in other words, the touch drag input is performed only to a middle area of the first input field, the controller 180 may split the first input field into a first sub input field and a second sub input field and control a real-time capture mode to be activated only in one of the sub input fields. It is preferred that the real-time capture mode may be activated in one sub input field formed in the area where the touch drag input is performed out of the two sub input fields.

At this time, an existing input mode is activated in the other one of the sub input fields continuously. In this instance, two input modes, in other words, a first input mode and a second input mode may be activated in the first input field together. For example, when the second input mode is activated in the second sub input field, the first input mode may be activated in the first sub input field.

In this embodiment, different types of data may be input to the sub input fields, respectively, by using the input modes activated in the sub input fields, respectively. For example, a text is input to the first sub input field and at least predetermined area of the captured image of the preview image is input to the second sub input field.

When the different data is input to the first sub input field and the second sub input field, the controller 180 may process that the data input to the first sub input field and the data input to the second sub input field are input to the first input field simultaneously, for example, when the first input field is a search box, the controller 180 may perform searching for a search word combined with a text input to the first sub input field and a text extracted from the captured image in the second sub input field in And (&) operation language.

Alternatively, the controller 180 may process that the data input to the first sub input field and the data input to the second sub input field are input to the first input field separately. In this instance, the controller 180 may process the data input to the first sub input field and the data input to the second sub input field separately and display the result of the processing together or separately. For example, in case the first input field is a search box, the controller 180 may performs searching for a text input to the first sub input field and for a text extracted from the captured image in the second sub input field. Hence, the controller may display the results of the searching for the texts in one screen.

Specifically, as shown in FIG. 7a, a touch drag input 10 performed along a longitudinal direction of the first input field 210 on the first input field 210 may be performed only to a middle area of the first input field 210. The first input field 210 may be a search box and the text input mode may be set to be a first input mode.

In response to the touch drag input 10, the controller 180 may split the first input field 210 into a first sub input field 210a and a second sub input field 210b as shown in FIG. 7b (1), instead of switching the input mode of the overall area of the first input field 210 into a real-time capture mode from a text input mode. Together with that, only the input mode of the second sub input field 210b of the two sub input fields 210a and 210b may be switched into the real-time capture mode. At this time, the text input mode may be still activated in the first sub input field 210a such that the preview image 300 may be displayed only in the second sub input field 210b.

As shown in FIG. 7b (1), a boundary between the first sub input field 210a and the second sub input field 210b split from the first input field 210 may be identical to an area where the touch drag input 10 finishes. In other words, the area where the touch drag input 10 is performed may be the second sub input field 210b and the other area may be the first sub input field 210a.

Figure 17A:
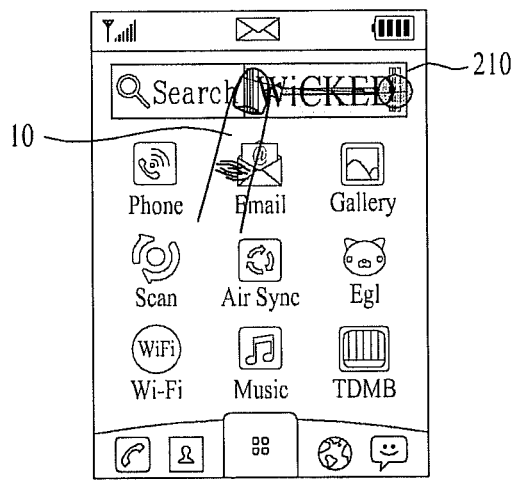
FIGS. 17a to 17c are diagrams illustrating one embodiment of a method for activating two input modes in the first input field.
Figure 17B:
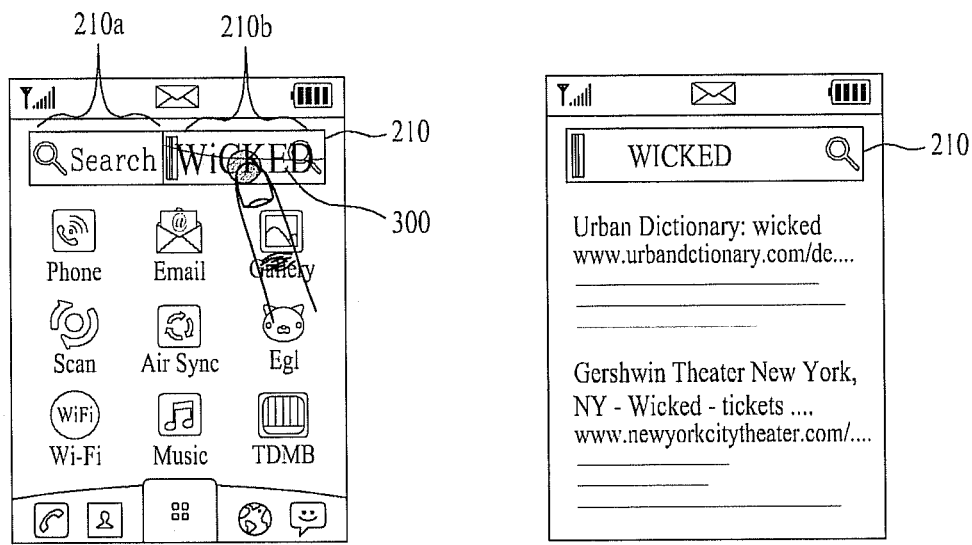

In a state where the text input mode is activated in the first sub input mode 210a and the real-time capture mode is activated in the second sub input field 210b, the user may touch the second sub input field 210b as shown in FIG. 17b (1). In response to the touch input, the controller 180 may control the camera 121 to capture the preview image 300 displayed in the second sub input field 210b.

As the preview image 300 is captured, the controller 180 may input a text of "WICKED" extracted from the captured preview image to the first input field 210 as data. Accordingly, the result of searching for the text of "WICKED" may be displayed as shown in FIG. 17b (2).

The first sub input field 210a and the second sub input field 210b may operate as independent input fields. Regardless of the preview image 300 displayed in the second sub input field 210b, a text may be input to the first sub input field 210a. If the input mode activated before the first sub input field 210a and the second sub input field 210b are split is a voice input mode, the controller 180 may control the user's voice to be inputted via the first sub input field 210a.

Figure 17C:
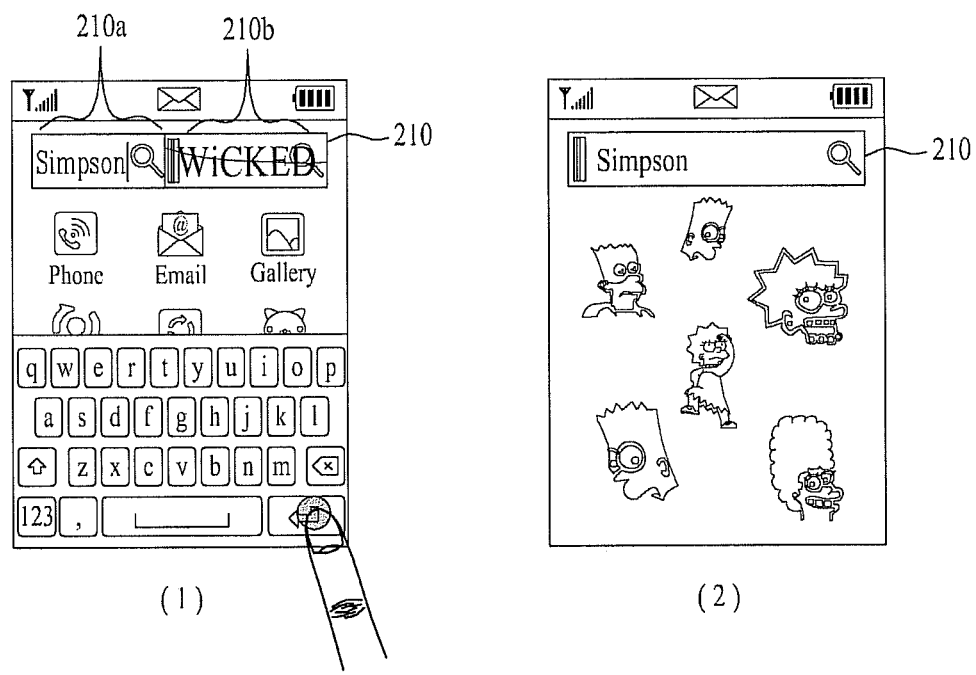

As shown in FIG. 17c (1), the user may a search word of "simpson" to the first input field 210a as text independently. After inputting the text of "simpson", the user may touch an icon configured to command searching. In response to the searching command, the controller 180 may display the result of searching for the text of "simpson" as shown in FIG. 17c (2).

According to this embodiment, the user can use two input modes in one input field simultaneously. Accordingly, two different data may be simultaneously input to the first input field in different methods or select one of two data inputting methods selectively.

FIG. 18 is a diagram illustrating one embodiment of a method for storing the other part of the preview video file when an image of the preview video file displayed in the first input field.

According to one embodiment, the controller 180 may store an overall external image including the preview image displayed in the first input field, when the preview image is captured. When detecting a fourth user command, the controller 180 may control other images of the overall external image, that are different from the preview image displayed in the first input field, to be displayed in the first input field. In other words, the overall external image may be scrolled in the first input field according to the fourth user command.

The overall external image means the overall image output on the camera 121 in real time, when a preview image is captured. In other words, the overall external image is an image photographed by the camera 121 and a predetermined part of the photographed image may be displayed in the first input field on the display 151. Accordingly, the overall external image may include the preview image displayed in the first input field as a part.

The fourth user command may be a touch input with a specific pattern. It is preferred that the fourth user command is a touch drag input having a specific directionality in the first input field. The controller 180 may control the overall external image to be scrolled in the first input field according to a direction of the touch drag input. As the overall external image is scrolled in the first input field, an object not provided in the preview image displayed in the first input field when the preview image is captured may be displayed in the first input field newly.

According to one embodiment, as shown in FIG. 18 (1), a predetermined area of the preview image 300 may be displayed in the first input field 210. At this time, the predetermine area displayed in the first input field 210 may be a partial image of the preview image 300 corresponding to the position and shape of the first input field 210. Different from the first input field 210 displaying only a character object of "WICKED", the overall preview image 300 outputted from the camera 121 may further include a poster, a tree, a building and other objects that have the character object. The overall preview image 300 is shown in a right portion of FIG. 18 (1).

As shown in FIG. 18 (2), when the preview image 300 displayed in the first input field 210 is captured by the user's touching of the first input field, the controller 180 may store the overall preview image as an overall external image 4201. In the overall external image 4201 may be provided with the character object of "WICKED" displayed in the first input field 210 as a part.

When the preview image 300 is captured, the controller 180 may extract a text of "WICKED" from the preview image 300 displayed in the first input field 210 simultaneously and perform searching for the text. Hence, the controller 180 may display a screen of the search result as shown in FIG. 18 (3) and display the captured image 420 via the first input field 210. The captured image 420 displayed in the first input field 210 may compose the overall external image 4201. In this state, a touch drag input 40 progressing toward a left upper end may be input as the fourth user command as shown in FIG. 18 (3).

As shown in FIG. 18 (4), the controller 180 may control the overall external image 4201 partially displayed in the first input field 210 to be scrolled. The scroll operation may enable a picture not displayed in the first input field 210 before the scroll to be displayed in the first input field newly, as shown in FIG. 18 (4).

According to this embodiment, after performing the capture, the user may change a part of the image that will be input to the first input field as data. As a result, the user can input the data desired to input to the input field precisely.

It will be apparent to those skilled in the art that the present invention can be specified into other form(s) without departing from the spirit or scope of the inventions.

In addition, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
 a camera configured to input an image thereto from outside of the mobile terminal;
 a display configured to display an implementing screen of an application including a first input field allowing a user to text input data and a second input field separate from the first input field, wherein the application is at least one of a message application, a contact list application, a web browser application and a calendar application; and
 a controller configured to:

control a predetermined area of a preview image of the camera to be displayed in the first input field by switching the first input field from a first input mode to a second input mode, capture the preview image displayed in the first input field, extract a text in the captured image via a character recognition, and input the extracted text in the first input field as the text input data, wherein the first input field receives the text input data from a keyboard or from pasting from a clipboard in the first input mode, wherein the first input mode and the second input mode of the first input field are selectively switched between each other by a user command, and wherein information displayed in the second input field remains displayed on the display when the first input mode of the first input field is switched to the second input mode of the first input field.

2. The mobile terminal according to claim 1, wherein the controller further configured to display a command icon for inputting a command to process the data input to the first input field.

3. The mobile terminal according to claim 1, wherein the controller further configured to control the display to:

display a second input field operating in the first input mode, and display together the first input field operating in the second input mode that displays at least some area of the image of the camera and the second input field operating in the first input mode when the input mode of the first input field is switched from the first input mode to the second input mode.

4. The mobile terminal according to claim 1, wherein the controller further configured to perform character recognition in the captured image, when the at least some area of the captured image is input to the first input field, and controls a text extracted by the character recognition to be inputted to the first input field as data.

5. The mobile terminal according to claim 1, wherein the first input field is a search box, and the controller further configured to display a result of searching for an object provided in the captured image when at least a predetermined area of the captured image is input to the first input field.

6. The mobile terminal according to claim 5, wherein the controller further configured to perform searching for the object based on location information of the mobile terminal.

7. The mobile terminal according to claim 1, wherein the controller controls the input mode of the first input field to be switched from the first input mode to the second input mode, when detecting a first user command, and the first user command is a touch drag input performed from one end of the first input field along a longitudinal direction of the first input field.

8. The mobile terminal according to claim 7, wherein the controller controls the input mode of the first input field to be switched from the first input mode to a third input mode, when detecting a second user command, and the second user command is a touch drag input performed from the other end of the first input field along the longitudinal direction of the first input field.

9. The mobile terminal according to claim 7, wherein the controller controls the first input field to be split into a first sub input field and a second sub input field and displayed, when the touch drag input of the first user command finishes in the first input field, and controls an input mode of the first or second sub input field to be switched to the second input mode.

10. The mobile terminal according to claim 7, wherein the controller automatically captures the displayed image, when the touch drag input of the first user command reaches the other end of the first input field.

11. The mobile terminal according to claim 1, wherein the controller automatically captures the displayed image, when an overall area of a character object provided in the displayed image is arranged in the first input field.

12. The mobile terminal according to claim 1, wherein the controller separately displays a character object and a picture object that are provided in the captured image, as the image is captured, and controls one of the separated character object and picture objects selected by the user to be inputted to the first input field as data.

13. The mobile terminal according to claim 1, wherein the controller changes a size of the first input field, when detecting a third user command.

14. The mobile terminal according to claim 1, wherein the controller controls a size of the first input field to be automatically changed and displayed to arrange an overall area of one object out of objects provided in the image of the camera in the first input field.

15. The mobile terminal according to claim 1, wherein the controller controls the image of the camera to be automatically zoomed out and displayed to arrange an overall area of one object out of objects provided in the image in the first input field.

16. The mobile terminal according to claim 1, wherein the controller stores an overall external image including the image displayed in the first input field, when the displayed image is captured, and the controller displays a different area of the overall external image from the image displayed in the first input field to be displayed in the first input field, when detecting a fourth user command.

17. The mobile terminal according to claim 1, wherein the controller configured to perform character recognition for a character object provided in the captured image, automatically display an implementing screen of an application connected with an information type of a text extracted by the character recognition, and input the extracted text to a third input field provided in the implementing screen as data.

18. A controlling method of a mobile terminal comprising:

inputting an external image to a camera;

displaying an implementing screen of an application including a first input field allowing a user to text input data and a second input field separate from the first input field, wherein the application is at least one of a message application, a contact list application, a web browser application and a calendar application;

controlling at least a predetermined area of a preview image of the camera in the first input field by changing the first input field from a first input mode to a second input mode;

capturing the preview image displayed in the first input field;

extracting a text in the captured image via a character recognition; and inputting the extracted text in the first input field to be inputted to the first input field as the text input data, wherein the first input field receives the text input data from a keyboard or from pasting from a clipboard in the first input mode, wherein the first input mode and the second input mode of the first input field are switched between each other selectively based on a user command, wherein information displayed in the second input field remains displayed when the first input mode of the first input field is changed to the second input mode of the first input field.

19. A non-transitory computer-readable medium comprising:
- a command configured to input an external image to a camera;
- a command configured to display an implementing screen of an application including a first input field allowing a user to text input data and a second input field separate from the first input field, wherein the application is at least one of a message application, a contact list application, a web browser application and a calendar application;
- a command configured to control a predetermined area of a preview image of the camera to be displayed in the first input field by changing the first input field from a first input mode to a second input mode;
- a command configured to capture the preview image displayed in the first input field;
- a command configured to extract a text in the captured image via a character recognition; and
- a command configured to input the extracted text in the first input field as the text input data, wherein the first input field receives the text input data by a keyboard or by pasting from a clipboard in the first input mode, wherein the first input mode and the second input mode of the first input field are selectively switched between each other by a user command, and wherein information displayed in the second input field remains when the first input mode of the first input field is changed to the second input mode of the first input field.

20. A mobile terminal comprising:
- a camera configured to input an image thereto from the outside;
- a display configured to display an implementing screen of a text or image inputting application including a first input field allowing a user to text input data and a second input field separate from the first input field, wherein the application is at least one of a message application, a contact list application, a web browser application and a calendar application; and
- a controller configured to:
  - control a predetermined area of a preview image of the camera to be displayed in the first input field by switching the first input field from a first input mode to a second input mode,
  - capture the preview image displayed in the first input field,
  - extract a text in the captured image via a character recognition, and
  - input the extracted text in the first input field as the input data, wherein the first input field receives the text input data from a keyboard or from pasting from a clipboard in the first input mode, wherein the first input mode and the second input mode are selectively switched by a user command, and wherein information of the second input field remains displayed when the first input mode of the first input field is switched to the second input mode of the first input field.

\* \* \* \* \*